US012560008B2

(12) United States Patent
Bertelli

(10) Patent No.: US 12,560,008 B2
(45) Date of Patent: Feb. 24, 2026

(54) LOCKING APPARATUSES AND A METHOD OF PROVIDING ACCESS CONTROL

(71) Applicant: HavenLock Inc., Franklin, TN (US)

(72) Inventor: Alexander Michael Bertelli, Nashville, TN (US)

(73) Assignee: HavenLock, Inc., Nashville, TN (US)

( * ) Notice: Subject to any disclaimer, the term of this patent is extended or adjusted under 35 U.S.C. 154(b) by 249 days.

(21) Appl. No.: 18/201,017

(22) Filed: May 23, 2023

(65) Prior Publication Data

US 2024/0117658 A1 Apr. 11, 2024

Related U.S. Application Data

(60) Continuation-in-part of application No. 17/329,116, filed on May 24, 2021, now Pat. No. 12,006,744, (Continued)

(51) Int. Cl.
*E05C 17/56* (2006.01)
*E05B 47/00* (2006.01)
(Continued)

(52) U.S. Cl.
CPC .......... *E05C 17/56* (2013.01); *E05B 47/0001* (2013.01); *E05B 47/023* (2013.01); (Continued)

(58) Field of Classification Search
CPC ...... E05C 17/56; E05C 19/001; E05C 19/008; E05C 17/54; E05C 17/50; E05C 19/004; (Continued)

(56) References Cited

U.S. PATENT DOCUMENTS 1,895,146 A 1/1933 Brown
2,312,235 A 2/1943 Cheremeteff
(Continued)

FOREIGN PATENT DOCUMENTS

CN 102655789 A 9/2012
CN 203570011 U 4/2014
(Continued)

OTHER PUBLICATIONS

Nov. 26, 2015—(WO) ISR & WO—PCT/US2015/045680.
(Continued)

*Primary Examiner* — Mark A Williams
(74) *Attorney, Agent, or Firm* — Bochner PLLC; Matthew J. May

(57) ABSTRACT

Apparatuses, methods, and systems for providing a locking apparatus for resisting movement of an openable element are described. The locking apparatus includes a mounting bracket, a central member, a stop plate, and a housing. The mounting bracket is couplable to the openable element. The central member is couplable to the mounting bracket and includes a body, an actuator, a lifting member coupled to the body and configured to be raise or lowered. The stop plate may be coupled to the frame of the openable element and aligned with at least a portion of the lifting member for restricting movement of the openable element when the lifting member is raised. The housing may be coupled to the mounting bracket and is generally used for aesthetic purposes. The locking apparatus may be one of a plurality of locking apparatuses grouped together for singular or group control, such as, for active shooter situations.

20 Claims, 26 Drawing Sheets

Related U.S. Application Data which is a division of application No. 16/856,691, filed on Apr. 23, 2020, now Pat. No. 11,421,456, which is a continuation of application No. 15/277,582, filed on Sep. 27, 2016, now Pat. No. 10,231,550, which is a continuation-in-part of application No. 14/828,821, filed on Aug. 18, 2015, now Pat. No. 10,851,568.

(60) Provisional application No. 62/038,393, filed on Aug. 18, 2014.

(51) Int. Cl.

| | |
|---|---|
| ***E05B 47/02*** | (2006.01) |
| ***E05B 63/00*** | (2006.01) |
| ***E05B 65/08*** | (2006.01) |
| ***E05C 19/00*** | (2006.01) |
| *E05B 41/00* | (2006.01) |

(52) U.S. Cl.

CPC ...... *E05B 63/0052* (2013.01); *E05B 65/0835* (2013.01); *E05C 19/001* (2013.01); *E05C 19/002* (2013.01); *E05C 19/004* (2013.01); *E05C 19/008* (2013.01); *E05B 41/00* (2013.01); *E05B 2047/0087* (2013.01); *E05B 2047/0094* (2013.01); *E05B 2063/0039* (2013.01)

(58) Field of Classification Search

CPC .... E05C 17/58; E05C 19/002; E05B 47/0001; E05B 47/023; E05B 63/0052; E05B 65/0835; E05B 2063/0039; E05B 65/06; Y10T 16/61; Y10T 292/73; Y10T 292/71; Y10T 292/65; Y10T 70/5168; Y10T 292/19; Y10S 292/15; Y10S 292/19; Y10S 16/17; E05Y 2201/224

See application file for complete search history.

(56) References Cited

U.S. PATENT DOCUMENTS

| | | | | | |
|---|---|---|---|---|---|
| 3,563,586 | A | | 2/1971 | Creamer et al. | |
| 3,805,322 | A | | 4/1974 | Serrano | |
| 4,383,708 | A | | 5/1983 | Lamberth | |
| 4,631,776 | A | | 12/1986 | King | |
| 4,797,970 | A | | 1/1989 | Charlton | |
| 4,819,976 | A | * | 4/1989 | Bert | E05B 65/104 292/48 |
| 5,036,685 | A | * | 8/1991 | Napolitano | E05C 19/002 292/238 |
| 5,447,347 | A | | 9/1995 | Siddons | |
| 5,465,460 | A | | 11/1995 | Cantone | |
| 5,492,381 | A | | 2/1996 | Waters | |
| 5,697,656 | A | | 12/1997 | Hebert et al. | |
| 5,755,582 | A | | 5/1998 | Charlton | |
| 5,775,460 | A | | 7/1998 | Stone | |
| 5,775,746 | A | | 7/1998 | Charlton | |
| 5,809,613 | A | | 9/1998 | Baines | |
| 6,000,735 | A | * | 12/1999 | Jourdenais | E05B 65/0841 70/276 |
| 6,336,245 | B1 | | 1/2002 | Sakakibara | |
| 6,727,805 | B2 | | 4/2004 | Hollister et al. | |
| 7,093,320 | B2 | * | 8/2006 | Tager | E05F 5/003 16/86 A |
| 8,272,241 | B2 | | 9/2012 | Brown et al. | |
| 8,528,272 | B1 | * | 9/2013 | Foss | E05F 17/001 52/106 |
| 8,807,605 | B1 | | 8/2014 | Dudley | |
| 8,925,359 | B2 | | 1/2015 | Frankel | |
| 9,115,517 | B2 | | 8/2015 | Clay et al. | |
| 10,662,684 | B1 | * | 5/2020 | Miller | E05C 17/003 |
| 10,669,758 | B2 | | 6/2020 | Bertelli et al. | |
| 2007/0073748 | A1 | | 3/2007 | Barney | |
| 2007/0176437 | A1 | | 8/2007 | Marschalek et al. | |
| 2009/0090144 | A1 | | 4/2009 | Zarnoti | |
| 2009/0113672 | A1 | | 5/2009 | Ibey | |
| 2009/0206616 | A1 | | 8/2009 | Liang et al. | |
| 2010/0019911 | A1 | * | 1/2010 | Chen | G08B 13/08 340/573.6 |
| 2010/0115853 | A1 | | 5/2010 | Gebhart | |
| 2010/0242368 | A1 | | 9/2010 | Yulkowski | |
| 2010/0301716 | A1 | | 12/2010 | Ranitlla | |
| 2011/0036131 | A1 | | 2/2011 | Chiou | |
| 2011/0084506 | A1 | | 4/2011 | Roatis et al. | |
| 2011/0101711 | A1 | | 5/2011 | Della-Santa | |
| 2011/0113695 | A1 | | 5/2011 | Derham | |
| 2011/0140463 | A1 | | 6/2011 | Nalepka | |
| 2011/0180353 | A1 | | 7/2011 | Askins | |
| 2011/0258227 | A1 | | 10/2011 | Lacasse | |
| 2011/0259059 | A1 | | 10/2011 | Wu | |
| 2011/0291848 | A1 | | 12/2011 | Burdenko | |
| 2012/0072034 | A1 | | 3/2012 | Cathcart | |
| 2012/0095748 | A1 | | 4/2012 | Li et al. | |
| 2012/0254181 | A1 | | 10/2012 | Schofield et al. | |
| 2013/0000205 | A1 | | 1/2013 | Raz et al. | |
| 2013/0159300 | A1 | | 6/2013 | Gallivan et al. | |
| 2013/0192317 | A1 | | 8/2013 | McKibben et al. | |
| 2013/0246315 | A1 | | 9/2013 | Joshi et al. | |
| 2014/0182343 | A1 | | 7/2014 | Talpe | |
| 2015/0211268 | A1 | | 7/2015 | Lott | |
| 2016/0186470 | A1 | | 6/2016 | Finley et al. | |
| 2018/0002956 | A1 | * | 1/2018 | Tran | E05C 17/50 |
| 2019/0078362 | A1 | * | 3/2019 | Presutti | G07C 9/00174 |
| 2019/0284855 | A1 | * | 9/2019 | Bertelli | E05B 47/00 |
| 2021/0032904 | A1 | | 2/2021 | Silvani, Jr. et al. | |
| 2021/0363798 | A1 | | 11/2021 | Subramanian | |

FOREIGN PATENT DOCUMENTS

| | | | |
|---|---|---|---|
| DE | 10051234 | A1 | 4/2002 |
| EP | 2749720 | A1 | 7/2014 |
| JP | H0594474 | U | 12/1993 |
| WO | 2011035389 | A1 | 3/2011 |
| WO | 2013124857 | A1 | 8/2013 |

OTHER PUBLICATIONS

Mar. 2, 2017—(WO) IPRP—PCT/US2015/045680.
Mar. 8, 2018—(EP) EESR—15833470.6.
Apr. 2, 2018—(CN) First Office Action & CSR—201580056581.3.
Jan. 30, 2020—(IN) Office Action—201717005924.

* cited by examiner

LOCKING APPARATUSES AND A METHOD OF PROVIDING ACCESS CONTROL

CROSS-REFERENCES TO RELATED APPLICATIONS

This application is a continuation-in-part of U.S. patent application Ser. No. 17/329,116, filed May 24, 2021, for "Locking Apparatuses and a Method of Providing Access Control," which is a division of U.S. patent application Ser. No. 16/856,691, filed Apr. 23, 2020, for "Locking Apparatuses and a Method of Providing Access Control," which is a continuation of U.S. patent application Ser. No. 15/277,582, filed Sep. 27, 2016, for "Locking Apparatuses and a Method of Providing Access Control," which is a continuation-in-part of U.S. patent application Ser. No. 14/828,821, filed Aug. 18, 2015, for "Locking Apparatus, Locking Member, and Method of Use," which claims the benefit of U.S. Provisional Patent Application No. 62/038,393 for "Door Lock Apparatus and Method," each of which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure related generally to an apparatus for resisting movement of an object. More specifically, the present disclosure relates to a mounted locking apparatus which is configured to prevent a door or other means of entry from being opened while the locking apparatus is in a locked state.

Traditional door lock mechanisms such as deadbolt locks are used to prevent or resist access to an interior of a location. Traditional deadbolt lock mechanisms are well known in the art. However, deadbolts can often be overcome with no tools and relatively little force. This may occur because the deadbolt must be mounted within the door itself and secured to a door frame. A deadbolt, mounted within the door, typically extends from the inner body of the door and into a small recess within the door face. In order for an intruder to break through a door locked using a typical deadbolt mechanism, the intruder need only kick the door at the weakest point, the lock strike plate. Even when fully engaged, a deadbolt is only able to apply resistive force across a small area of a door and door frame. Furthermore, traditional deadbolts are easily defeated, for example by lock bumping.

Therefore, in order to increase security and to protect against traditional door lock mechanism shortcomings, what is needed is an improved locking apparatus capable of providing greater strength and resiliency.

BRIEF SUMMARY

In accordance with one aspect of the invention, a locking apparatus is provided for resisting movement of an openable element. The locking apparatus includes a body, an actuator, a lifting member, at least a portion of the lifting member being configured to be raised or lowered relative to the body according to an output of the actuator, the lifting member comprising a contact surface configured to restrict movement of the openable element, and a strap coupled to the body and to the lifting member, the strap configured to permit the lifting member to flex based at least in part upon contact between the lifting member and the openable element and to transfer energy received at the lifting member into the body of the locking apparatus into a surface to which the locking apparatus is mounted.

In accordance with a further aspect of the invention, provided is a method of providing access control using a locking apparatus having a control circuit, an actuator, and a lifting member. The method includes receiving an operating command at a control circuit of the locking apparatus, processing the received operating command to determine an actuator command, providing the actuator command to the actuator of the locking apparatus, producing an actuator output based on the actuator command, manipulating a height of the lifting member of the locking apparatus based at least in part upon the actuator output, detecting contact between an object and the locking apparatus when at least a portion of the object is placed in contact with a contact surface of the lifting member, and resisting movement of the object by the locking apparatus when the height of the lifting member is associated with a locked position.

In accordance with a still further aspect of the invention, provided is a locking apparatus for resisting movement of an openable element. The locking apparatus includes a central member having a body, an actuator, a lifting member, at least a portion of the lifting member being configured to be raised or lowered relative to the body according to an output of the actuator, the lifting member comprising a contact surface configured to restrict movement of the openable element, a strap coupled to the body and to the lifting member, the strap configured to permit the lifting member to flex based at least in part upon contact between the lifting member and the openable element and to transfer energy received at the lifting member into the body of the locking apparatus into a surface to which the locking apparatus is mounted, and a control circuit configured to control operations of the locking apparatus. The locking apparatus further includes an outer housing connected to the central member and a power housing connected to the central member.

In accordance with a further aspect of the invention, provided is a locking apparatus for resisting movement of an openable element positioned within a frame. The locking apparatus may include mounting bracket, a central member, a stop plate, and a housing couplable to the mounting bracket for concealing the various elements of the locking apparatus. The mounting bracket may have a mounting portion and a support portion, the mounting portion configured to be coupled to the openable element. The central member may be configured to be coupled to the support portion of the mounting bracket. The central member may comprise a body, an actuator, and a lifting member coupled to the body. At least a portion of the lifting member may be configured to be raised or lowered relative to the body by the actuator. The lifting member may comprise a contact surface configured to restrict movement of the openable element when the lifting member is raised. The stop plate may be configured to be coupled to the frame and aligned with at least a portion of the lifting member for restricting movement of the openable element when the lifting member is raised. The housing may be coupled to the mounting bracket and at least partially surrounding the central member and the mounting bracket.

Numerous other objects, features, and advantages of the present invention will be readily apparent to those skilled in the art upon a reading of the following disclosure when taken in conjunction with the accompanying drawings.

DETAILED DESCRIPTION

Figure 1:
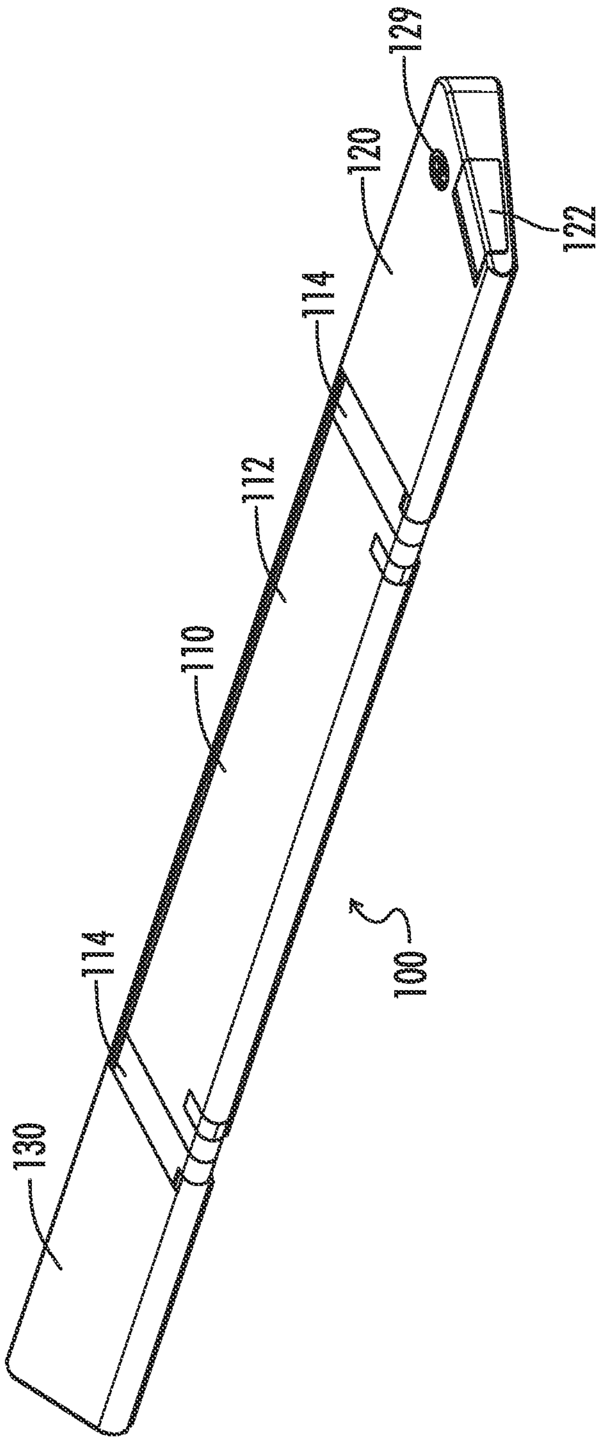
FIG. 1 is an elevated perspective view of a locking apparatus according to an exemplary embodiment.

While the making and using of various exemplary embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

Where the various figures may describe embodiments sharing various common elements and features with other embodiments, similar elements and features are given the same reference numerals and redundant description thereof may be omitted below.

To facilitate the understanding of the embodiments described herein, a number of terms are defined below. The terms defined herein have meanings as commonly understood by a person of ordinary skill in the areas relevant to the present invention. Terms such as “a,” “an,” and “the” are not intended to refer to only a singular entity, but rather include the general class of which a specific example may be used for illustration. The terminology herein is used to describe specific embodiments of the invention, but their usage does not delimit the invention, except as set forth in the claims. The phrase “in one embodiment,” as used herein does not necessarily refer to the same embodiment, although it may.

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The term "user interface" as used herein may unless otherwise stated include any input-output module with respect to the hosted server including but not limited to web portals, such as individual web pages or those collectively defining a hosted website, mobile applications, desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The term "communications medium" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

With reference to FIG. 1, provided is a locking apparatus 100 in accordance with an exemplary embodiment of the present disclosure. Locking apparatus 100 may comprise a central member 110 having a lifting member 112 and at least one stop member 114 located at an end thereof. In one embodiment, the locking apparatus 100 may comprise one or more of an outer housing 120 and power housing 130 connected thereto. The locking apparatus 100 may be modularly formed of a central member 110 and one or more of outer housing 120 and power housing 130. As used herein, the term "central" may denote aspects other than or in addition to a physical location. For example, the term "central" as used herein may convey an operational aspect and/or interrelationship as applied. In one exemplary embodiment, at least one of the outer housing 120 and power housing 130 may be physically located at a central location of an assembled locking apparatus 100 without departing from the spirit or scope of the present disclosure. Although described with reference to a lock or locking, it should be appreciated that the locking apparatus 100 functionally operates as a barrier to restrict movement of an object, and thus should not be narrowly construed as merely a traditional lock, and does not require a particular "key" or physical or electronic unlocking device to operate. Accordingly, the locking apparatus 100 may take the form of a barrier apparatus consistent with the disclosure provided herein.

In one embodiment, the overall structure of the locking apparatus 100 may form a convex quadrilateral such as a trapezoid. In the exemplary embodiment illustrated at FIG. 1, for example, the central member 110 may be rectangularly shaped, while the outer housing 120 and power housing 130 may be shaped as a trapezoid. However, the shape of each of the central member 110, outer housing 120, and power housing 130 may vary based upon desired usage, thus an overall shape of the locking apparatus 100 may vary.

At least a portion of lifting member 112 of central member 110 may be configured to elevate during operation of the locking apparatus 100. In one exemplary embodiment described herein, at least a portion of the lifting member 112 may be elevated more at a proximal side of the locking apparatus 100 relative to a door frame than at a distal side relative to the door frame. In doing so, a force applied at the lifting member 112 by contact with a door or other object may be translated downwardly along the lifting member 112 and into a surface to which the locking apparatus is mounted, thereby increasing an amount of force capable of being resisted by the locking apparatus 100.

Figure 4:
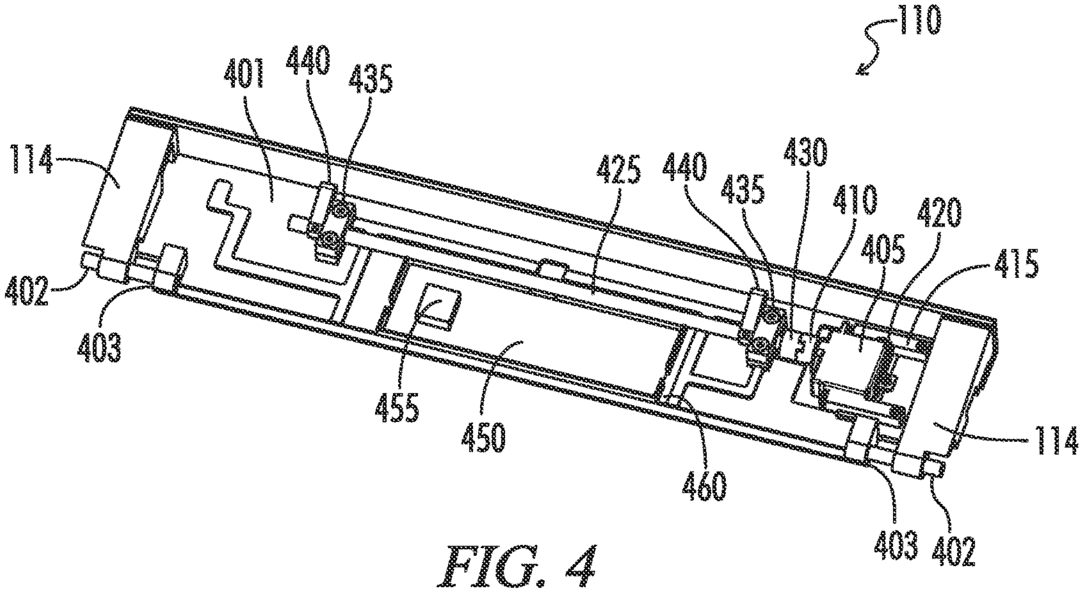
FIG. 4 is an elevated perspective view of an interior portion of a central member of a locking apparatus according to an exemplary embodiment.

An inner portion of the lifting member 112 may comprise notches, divots, or cam receptacles. The notches, divots, or cam receptacles may be configured to be placed in contact with at least one cam 440 (as illustrated at FIG. 4 and described herein) of the central member 110. In one embodiment, the at least one cam 440 may be placed in constant contact with the lifting member 112 during operation. In an alternate embodiment, the at least one cam 440 may be configured to be placed in contact with the lifting member 112 only during particular operations, such as increasing a height of the lifting member 112 and/or decreasing the height of the lifting member 112.

The lifting member 112 may comprise a single structural element in one embodiment or may comprise a plurality of structural elements without departing from the spirit and scope of the present disclosure. For example, in one embodiment the lifting member 112 may be formed of two or more structural elements which are configured to nest within each other when the locking apparatus 100 operates in an unlocked state, and to expand to separate associated heights when operating in a locked state. In one implementation, at least one of the plurality of structural elements may be selected based on a desired overall height of the lifting member 112 in a locked state. In a separate embodiment, the plurality of structural elements may collectively be arranged at a single height when in a locked position, and/or may provide for a single or a plurality of contact points with a door or object whose movement is intended to be restricted. When a plurality of nested structural elements are used for lifting member 112, a gap distance between a contact surface of the lifting member 112 and the door or object whose movement is intended to be restricted may be reduced as compared to a single lifting member embodiment. In addition to lifting member 112, a height of the at least one stop member 114 may be manipulated within the scope of the present disclosure. This may be accomplished, for example, based on a connection between the lifting member 112 and at least one stop member 114 and/or by connection between at least one cam 440 and the at least one stop member 114.

In one embodiment, locking apparatus 100 may comprise a single central member 110 without either or both of outer housing 120 and power housing 130 connected thereto. In another embodiment, one or more central members 110 may be connected to form a single locking apparatus 100. In this configuration, the plurality of central members 110 may communicate with one another to coordinate operation and function as a single member. In an alternate embodiment, a plurality of central members 110 may be interconnected as separate locking apparatuses 100, each operating independently of one another. Because of the modular nature of locking apparatus 100, a size associated with each component of the locking apparatus 100 may vary, and the ultimate size of a locking apparatus 100 depends on a size and number of each central member 110, outer housing 120, and/or power housing 130 connected thereto. Each of the central member 110, outer housing 120, and/or power housing 130 may be implemented in various sizes to permit usage in any intended application. For example, a central member 110 may be implemented having various widths and associated contact surface size, such that a central member 110 may have a width such as ten inches, thirty-six inches, or any other desired size based on implementation.

Outer housing 120 may be configured to physically and/or electrically connect to a central member 110. For example, an outer housing 120 may be connected to a central member 110 by moving the outer housing 120 inwardly towards the at least one stop member 114. In this example, the outer housing 120 or central member 110 may comprise a connection mechanism which detachably connects the outer housing 120 and central member 110 when the outer housing 120 is moved inwardly relative to the central member 110. Alternatively or in conjunction with attachment to the central member 110, the outer housing 120 and central member 110 may connect via at least a portion of the at least one stop member 114.

Each of the central member 110, outer housing 120, and/or power housing 130 may be formed of a durable material and each form a cavity therein. Examples of durable materials which may be used are glass-filled nylon such as nylon 66, metals such as aluminum, titanium, or the like, plastics, or any other material capable of structural rigidity sufficient for operating conditions of the locking apparatus 100. The central member 110, outer housing 120, and power housing 130 may each have a cavity formed therein configured to house internal components.

When combined, the locking apparatus may be configured to be arranged in an elongated structure with one or more central members 110, outer housings 120, and/or power housings 130 connected at one or more of opposing longitudinal ends of a central member 110. At least one other central member 110, outer housing 120, or power housing 130 may, in various embodiments, be attached to a central member 110 at any surface of the central member 110, based on a desired operational configuration (e.g., at a location other than a longitudinal end). Electrical connection(s) between internal components of central member 110 and between central member 110, outer housing 120, and power housing 130 may be accomplished by means of conventional wiring and connectors, which are not illustrated in the drawings for purposes of promoting clarity.

Figure 2:
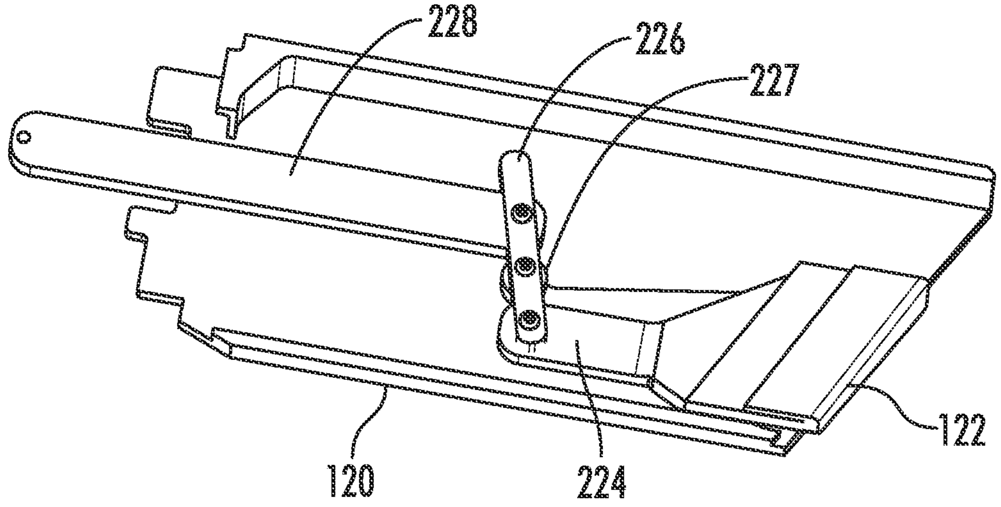
FIG. 2 is an elevated perspective view of an interior section of a power housing of a locking apparatus according to an exemplary embodiment.

In one exemplary embodiment, the outer housing 120 may be configured with a locking mechanism 122 housed therein. Locking mechanism 122 may optionally be configured as a push/pull type manual unlock, a pressure sensitive foot pedal, or any other means of manual operation capable of engaging and/or disengaging an operational status of the locking apparatus 100. As illustrated, for example, in FIG. 2, a push-pull type mechanism may comprise an operating arm 224, crossmember 226, and engagement arm 228. Operating arm 224 and engagement arm 228 may be connected to each other by means of interconnection with the crossmember 226. Although crossmember 226 is illustrated in FIG. 2 as being connected to operating arm 224, engagement arm 228, and a central pivot point 227 by means of screws or bolts, any fastening means capable of attaching the crossmember 226 to the operating arm 224, engagement arm 228, and pivot point 227 may be used within the spirit and scope of the present disclosure.

In operation, the locking mechanism 122 may be configured to permit manual engagement or disengagement of the locking apparatus 100. For example, in one exemplary embodiment, the locking mechanism 122 may be configured such that at least a portion of operating arm 224 extends to protrude from an outer surface of the outer housing 120 when the locking apparatus 100 operates in a locked mode. If a user desires to manually disengage the locking apparatus 100, the user may push the operating arm 224 inwardly towards the central member 110. The movement of the operating arm 224 may cause the crossmember 226 to rotate relative to the pivot point 227, for example in either a clockwise or counterclockwise direction. Based on its attachment to the engagement arm 228, crossmember 226's rotation may cause the engagement arm 228 to move in an engagement direction. In one embodiment, the engagement direction may be a longitudinal direction associated with the central member 110. Movement in the engagement direction may activate a manual release 420 of actuator 405 (illustrated at FIG. 4) to manipulate an operating status of the locking apparatus 100 in a manner as described herein.

Either alternatively or in addition to a push/pull type mechanism, other means of manual operation are contemplated within the scope of the present disclosure. For example, a foot pedal (not illustrated) may be used at an outer surface of the outer housing 120 to manipulate a manual release associated with the locking apparatus 100. For example, a foot pedal 54 and associated structure as described in Provisional Patent Application 62/038,393 (as incorporated by reference herein in its entirety) may be implemented for manual operation.

Outer housing 120 may further comprise an illuminating member 129. Illuminating member 129 may comprise a lighting element such as a light emitting diode (LED) or the like which is powered either by a power source (e.g., a battery or other input power) associated with the outer housing 120, or by an electrical connection to central member 110 or power housing 130. In one embodiment, a faceplate containing a logo or other item desired to be illuminated may be placed atop the illuminating member 129 to provide backlighting for the faceplate. In one exemplary embodiment, the illuminating member 129 may be configured to vary an illumination color based on a status of the locking apparatus 100. For example, the illuminating member 129 may display a first color while the locking apparatus operates in an unlocked mode, while a second color may be displayed while the locking apparatus operates in a locked mode. The illuminating member 129 may also be configured to vary a color or display mode for purposes of conveying information to a user. For example, the illuminating member may provide various color or display patterns to convey lock status, information related to usage (e.g., battery backup power usage, etc.), device pairing status, or any other information desired to be conveyed by the locking apparatus 100. Electrical connection(s) between internal components of outer housing 120 and between outer housing 120 and central member 110 may be accomplished by means of conventional wiring and connectors, which are not illustrated in the drawings for purposes of promoting clarity.

Figure 3:
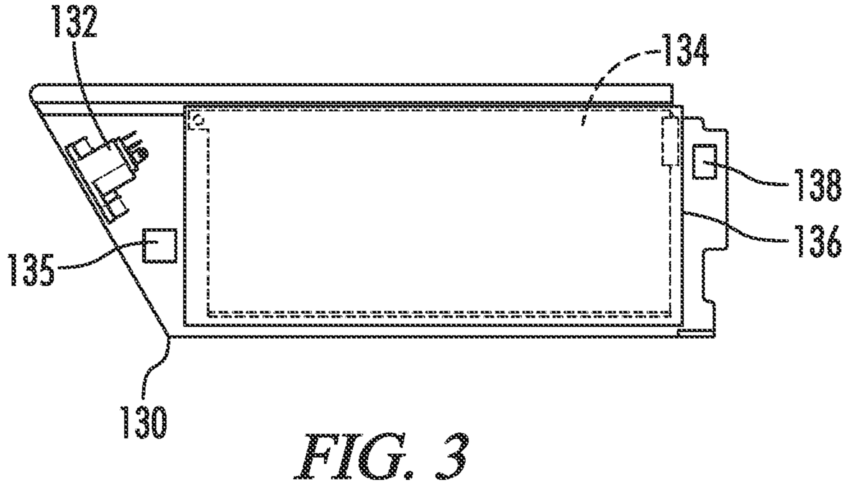
FIG. 3 top internal view of an outer housing of a locking apparatus according to an exemplary embodiment.

In one embodiment, one or more power housings 130 may be connected to a central member 110. As illustrated in FIG. 3, power housing 130 may comprise one or more of a power input 132 and battery 134. Power input 132 may be configured to be located at an outer surface of the power housing 130 and to receive input power from an external source (e.g., a power adapter or other power input means). In one embodiment, the power input 132 may be connected to the battery 134 and may be configured to provide charging power to the battery 134 when a power source is connected to the power input 132. Electrical connection (s) between internal components of power housing 130 and between power housing 130 and central member 110 may be accomplished by means of conventional wiring and connectors, which are not illustrated in the drawings for purposes of promoting clarity.

Battery 134 may comprise a lithium-ion, aluminum-ion, sodium-nickel chloride, polymer, or other battery design which is configured to provide sufficient power storage, durability, and/or thermal properties. Alternatively or in addition to the above-noted battery designs, battery 134 may comprise or include at least one ultracapacitor. In one exemplary embodiment, the battery 134 may comprise a rechargeable lithium-ion battery. The location of battery 134 and design within the power housing 130 may be configured so as to increase the longevity of holding a charge and to prevent damage to the battery 134 (e.g., by means of water damage, electrical charge, or wear and tear). The battery 134 may be positioned within the cavity of the power housing 130. In one embodiment, the battery 134 may be located within an insulated compartment 136. The insulated compartment 136 may be configured to be waterproof and to electrically insulate the battery 134 therein.

In one embodiment a battery backup 135 may be used either as part of battery 134 or as a standalone backup. The battery backup 135 may comprise, for example, one or more alkaline batteries electrically connected to the locking apparatus 100. The battery backup 135 may be used to provide power to the locking apparatus 100 in the event that the battery 134 has insufficient capacity or is incapable of meeting a power demand of the battery 134. For example, the battery backup 135 may provide power in the event that battery 134 is fully discharged, is not operating properly, or is low on power. In an exemplary embodiment, the one or more alkaline batteries may be selected so as to provide six months or more of operating the locking apparatus 100 according to ordinary usage. The battery backup 135 may comprise three AAA batteries in one embodiment.

In one exemplary embodiment, the locking apparatus 100 may provide a notice to a user that the locking apparatus 100 is operating on battery backup power. The locking apparatus 100 may communicate a status to a user in a number of ways. For example, the locking apparatus 100 may emit a noise such as a beep, either continuously or at a specified interval, the illuminating member may blink to indicate backup power, the locking apparatus 100 may transmit and electronic communication to convey backup power usage to a user, etc.

Power housing 130 may be configured to provide electrical power to the central member 110, for example by use of matching connectors 138 located at the power housing 130 and central housing 110. In one exemplary embodiment the matching connectors may be located within at least one of the cavities of the power housing 130 and central member 110. For example, power housing 130 may comprise a power housing connector 138 configured to electrically connect to a corresponding connector of central member 110. In one embodiment, the corresponding connector of central member 110 may be associated with a stop member 114; however the corresponding connector of central member 110 may additionally or alternatively be associated with the central member 110 of itself or internal component therein.

FIG. 4 illustrates internal components within the cavity of central member 110 according to an exemplary embodiment. A bottom surface of the central member 110 may comprise a base 401. At least one opening 402 may be formed in the base 401 at a distal side of the central member 110 relative to a door frame. The at least one opening 402 may have at least one rotation-enabling member 403 to permit at least a portion of lifting member 112 to elevate during operation. Central member 110 may further comprise an actuator 405. Actuator 405 may be variously implemented to provide for lifting power necessary to raise and/or lower lifting member 112 during operation. In one exemplary embodiment, the actuator 405 may comprise a servo; however any actuating device capable of manipulating a physical location of lifting member 112 may be used within the spirit and scope of the present disclosure. The actuator 405 may be mounted to the base 401 using mount 415 attached to or formed by the base 401. Actuator 405 may comprise a coupler 410 for connecting to an external translating member. In one embodiment, actuator 405 may be configured to provide an output corresponding to a locked and an unlocked state. For example, the actuator 405 may be configured in one embodiment to provide output rotation at a designated amount in a designated direction corresponding to each state.

Actuator 405 may further comprise a manual release 420. Manual release 420 may be configured to receive an input and to transition actuator 405 to a different operating state. For example, the manual release 420 may be configured to transition actuator 405 to an unlocked state from a locked state when an input is received from locking mechanism 122. Alternatively, the manual release 420 may be configured to permit purely manual operation by changing an operating state of the locking apparatus 100 when an input is received (i.e., by switching between a current locked state to an unlocked state or between a current unlocked state to a locked state upon receiving input).

In one embodiment, the coupler 410 of actuator 405 may attach to a shaft 425 at a shaft coupler 430. As illustrated, for example, at FIG. 4, the coupler 410 of actuator 405 and the shaft coupler 430 of shaft 425 may be implemented using matching notches to permit interconnection. However, connecting notches are not required to be used to connect the actuator 405 and shaft 425, and in one embodiment, the shaft 425 may connect directly to the actuator 405. The shaft 425 may be connected to the body 401 of central member 110 by means of at least one coupler 435. The at least one coupler 435 may be configured to hold the shaft 425 in position relative to the body 401, actuator 405, and/or lifting member 112.

At least one cam 440 may be connected to the shaft 425. The at least one cam 440 may be configured to rotate in a manner consistent with shaft 425 during operation and may be placed in contact with an inner surface of the lifting member 112. Although two cams 440 are illustrated in FIG. 4, only one cam 440 may be used, or three or more cams 440 may be used without departing from the spirit and scope of the present disclosure. In one embodiment the at least one cam 440 may be positioned relative to the shaft 425 such as to reduce potential damage to components of the central member 110 when an external force is applied to lifting member 112 or any other portion of locking apparatus 100. Furthermore, the at least one cam 440 may be configured to maintain an angle relative to the lifting member 112 such that an external force applied to the lifting member 112 or other portion of locking apparatus 100 will not cause the at least one cam 440 to move or the shaft 425 to rotate. As such, in one embodiment, the configuration of the at least one cam 440 and shaft 425 may be such that structural rigidity and locking integrity is increased.

In one embodiment, the actuator 405 may cause the shaft 425 to rotate the at least one cam 440 such that an external surface of the lifting member 112 attains a predetermined angle relative to a surface upon which the locking apparatus 100 is mounted. The predetermined angle may be determined at a time of manufacture or may be configured by a user. The predetermined angle may be configured such that a contact position of the at least one cam 440 is perpendicular to the lifting member 112. The predetermined angle may vary based upon intended operation. For example, a smaller angle may be preferable where a small distance exists between a surface that the locking apparatus 100 is mounted upon and an object whose movement is to be retrieved, when compared to a greater distance. Alternatively, a larger angle may be preferable to resist an external force pushing downward upon an exterior surface of the lifting member 112. In one exemplary embodiment, a predetermined angle of between 15 and 20 degrees may be used. However, any angle may be used within the scope of the present disclosure for a corresponding intended purpose.

Central member 110 may further comprise a control circuit 450. In one embodiment, the control circuit 450 may be attached to the body 401 by means of circuit mount 460. In one embodiment, control circuit 450 is configured to control power distribution within the locking apparatus 100 and to enable automated control of the locking apparatus 100. In one exemplary embodiment, the control circuit 450 may comprise a transceiver 455 to send and receive control signals. In one embodiment, the transceiver 455 may comprise a wired or wireless connection medium. At least a portion of the transceiver 455 may be accessible from an outer surface of the locking apparatus 100 or may be wholly within the cavity of the central member 110. Transceiver 455 may permit communications across a communication medium using known communications protocols or proprietary communication protocols. For example, the transceiver 455 may permit the use of Ethernet, Bluetooth, Wi-Fi, a wireless application protocol, an IEEE 802 standard, or any other communications protocol, configuration, or implementation. It should be appreciated that in various embodiments, the locking apparatus 100 may be configured in a manual operating mode, without using or requiring the control circuit 450.

In one exemplary embodiment, the transceiver 455 may be configured to communicate with a software application running on a device. For example, the transceiver 455 may be configured to send and receive messages relating to a user device running the software application (e.g., by means of a user interface executed upon a device). The software application may be configured such that a user of the software may cause the control circuit 450 to actuate various operations corresponding to a user's command. For example, the software may enable a user to request that the locking apparatus 100 operate in either a locked or unlocked state. Upon receiving a requested operation at the transceiver 455, the control circuit 450 may control the locking apparatus 100 to perform the desired operation. The control circuit 450 may permit a great variety of desired automation and remote control capabilities. For example, in one exemplary embodiment, the control circuit 450 may be paired with a user device (e.g., using the Bluetooth protocol). After pairing, the control circuit 450 may be programmed to ensure that the locking apparatus 100 operates in an unlocked state whenever the paired user device is within a predetermined distance of the locking apparatus 100 (e.g., within ten feet).

Similarly, the control circuit 450 may, in one embodiment, permit the locking apparatus 100 to detect at least one device other than a paired user device and to notify an owner of the locking apparatus of an identifier associated with the detected device and/or provide the ability to remotely transition the locking apparatus 100 to a locked or unlocked state. The control circuit 450 may further enable the locking apparatus 100 to be programmed to operate in a locked or unlocked state at a predetermined time or event in one embodiment.

Figure 5:
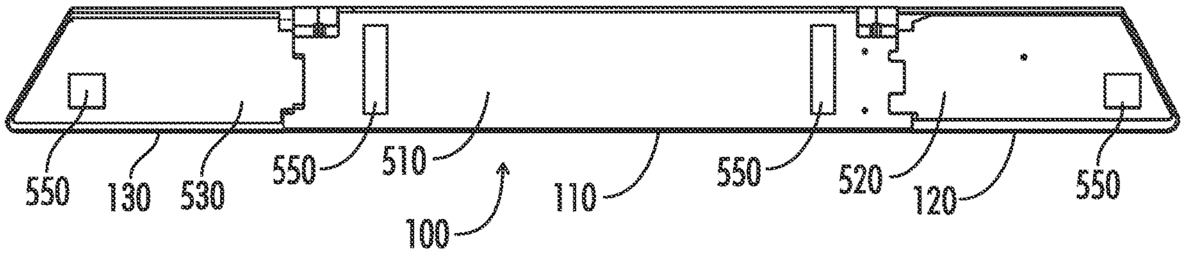
FIG. 5 is a bottom view of a locking apparatus according to an exemplary embodiment.

FIG. 5 illustrates a bottom view of an assembled locking apparatus according to an exemplary embodiment. As illustrated, central member 110 may comprise a bottom surface 510, outer housing 120 may comprise a bottom surface 520, and power housing 130 may comprise a bottom surface 530. Each of the bottom surfaces 510, 520, and 520 may be configured to include at least one mounting location 550. Each mounting location 550 may be used to secure the locking apparatus 100 to a surface upon which it is intended to be mounted.

Locking apparatus 100 may be attached to a surface upon which it is intended to be mounted using any one of at least one bolt, at least one hook and loop fastener, an adhesive material (e.g., any double sided tape, a tape such as 3M™ VHB™, etc.), or any other means of attachment, either alone or in combination. Furthermore, the means of attaching the locking apparatus 100 to the surface upon which it is intended to be mounted may be located upon at least one surface of the locking apparatus 100, the surface upon which it is intended to be mounted, or any combination thereof. In one exemplary embodiment, the locking apparatus 100 may comprise at least one opening at a bottom surface thereof which may be used to mount the locking apparatus 100 to an intended mounting location by placing a bolt, screw, nail, tape, or other affixing element into or through the at least one opening and into or onto the surface upon which the locking apparatus 100 is intended to be mounted. Optionally, the at least one opening may be provided by means of a mounting bracket configured to be placed between the locking apparatus 100 and mounting surface during installation.

At least one of the central member 110, outer housing 120, and power housing 130 may be placed in contact with a threshold and/or door frame to provide bracing and/or structural rigidity. The locking apparatus 100 may optionally be mounted to the threshold and/or door frame by means the same or similar mounting means as described herein.

Figure 6:
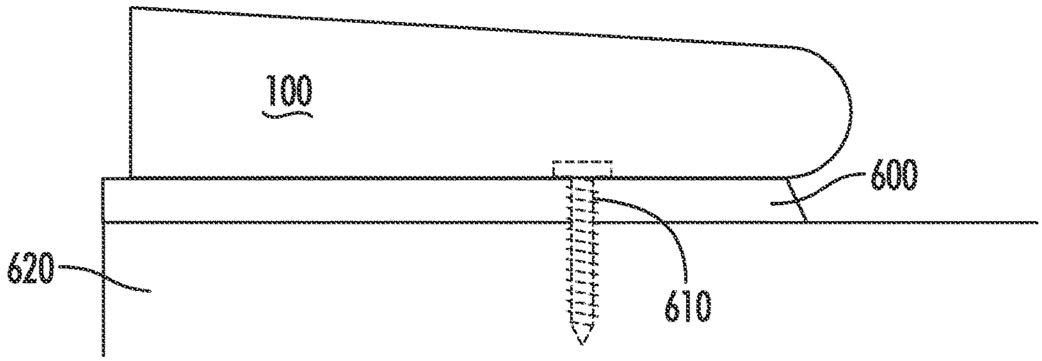
FIG. 6 is a side view of a locking apparatus and a riser according to an exemplary embodiment.

In addition to use of a predetermined angle, other mechanisms for adjusting to a height between a surface upon which the locking apparatus 100 is mounted and a door height are contemplated within the scope of the present disclosure. For example, as illustrated at FIG. 6, a riser 600 may be used to increase an overall height of the locking apparatus 100. In one embodiment, the locking apparatus 100 may be mounted to the riser 600. The locking apparatus 100 may be mounted to the riser 600 at mounting point 610. Mounting point 610 may comprise any means of attaching the locking apparatus 100 to the riser 600 and/or surface 620. In one embodiment, the locking apparatus 100 may be attached to the riser 600 using screws or other fastening means.

The locking apparatus 100 may optionally be attached to the riser 600 using any single element or combination of at least one bolt, at least one hook and loop fastener, an adhesive material (e.g., any double sided tape, a tape such as 3M™ VHB™, etc.), or any other means of attachment. Furthermore, the means of attaching the locking apparatus 100 to the riser 600 may be located upon at least one surface of the locking apparatus 100, at least one surface of the riser 600, or any combination thereof.

In an alternative exemplary embodiment, a riser 600 may be placed atop an upper surface of lifting member 112 to increase an overall height thereof. In this configuration, the riser 600 may be attached directly to a top surface of riser 600 or may be attached to any portion of the locking apparatus 100 where such attachment is capable of preventing movement of the riser 600 relative to the locking apparatus 100.

In one exemplary embodiment, the riser 600 may be configured to conform to legal requirements for threshold height. For example, the riser 600 may be configured or adjusted to satisfy a one-half inch height requirement in accordance with the Americans with Disabilities Act (ADA). Because threshold height may vary widely based upon installation and indoor floor height, riser 600 may be used to help satisfy ADA height requirements, as well as to form an ideal contact surface between the locking apparatus 100 and an object whose movement is intended to be restricted. In one embodiment, the riser 600 may, for example, provide for at least one inch of lift and/or at least 30 degrees of elevation to the lifting member 112.

Figure 7:
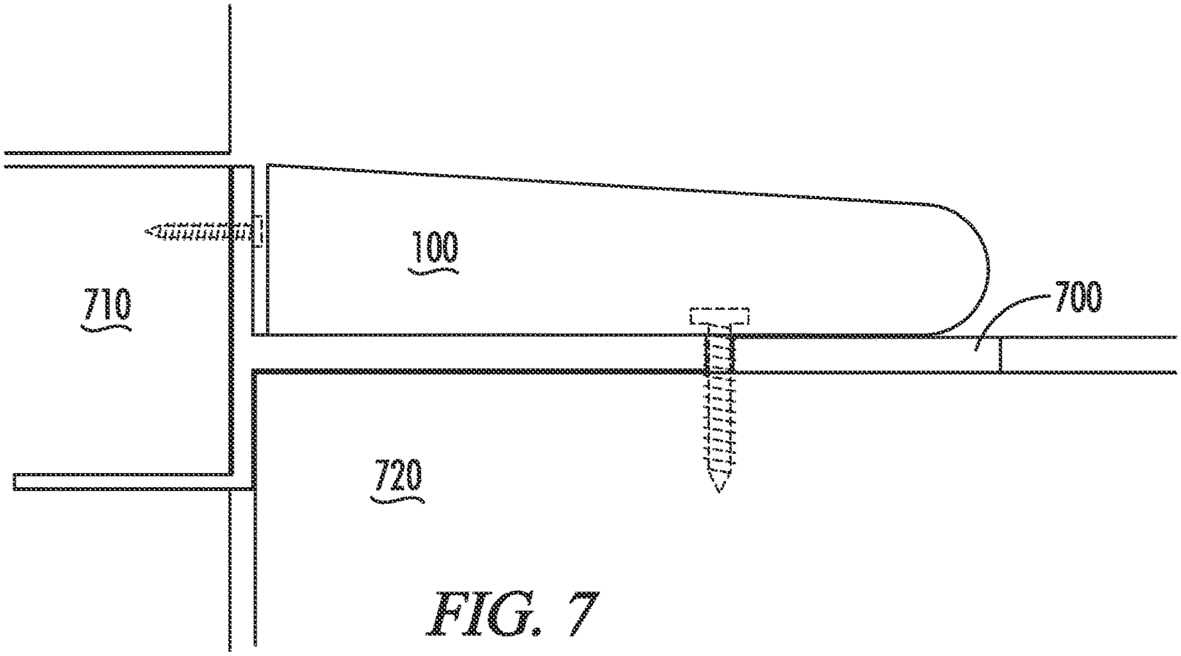
FIG. 7 is a side view of a locking apparatus and a connection plate according to an exemplary embodiment.

In one embodiment, the locking apparatus 100 may be configured to attach to a connection plate 700, as illustrated at FIG. 7. Connection plate 700 may be formed of any durable and/or rigid material capable of attachment to the locking apparatus 100. The connection plate 700 may be used in one embodiment to facilitate attachment of the locking apparatus 100 to the surface (e.g., surface 720) upon which the locking apparatus 100 is intended to be mounted. For example, the connection plate may provide pre-cut screw or bolt holes, may have double sided tape provided at predetermined locations, etc.

The connection plate 700 may be further configured to provide additional structural integrity and/or rigidity to the locking apparatus 100. In one embodiment, the connection plate may be designed for installation at a time when a door frame is installed. The connection plate 700 may be configured to be placed under door sill 710 and/or to attach to one or more surfaces of the door frame 710 in order to provide additional strength and rigidity. In one embodiment, the connection plate 700 may be connected to a sill frame and/or mounting bracket.

Connection plate 700 may be used either in place of or in addition to riser 600 as desired. For example, a thickness of the connection plate 700 may be adjustable or possess a thickness so as to incorporate desired features of riser 600.

In one embodiment, the connection plate 700 may comprise a universal installation plate (UIP) configured to permit installation of a locking apparatus according to a particular desired implementation. Although the use of a UIP is not required to be installed with a locking apparatus 100, use of a UIP may expand installation capability, for example to accommodate a particular floor surface, a distance of the locking apparatus 100 from a door frame, or a particular property makeup of a floor surface. The UIP may be configured to adjust to a plurality of door applications. A UIP may be mounted in a plurality of ways, for example, under a door threshold, between a door and a sill plate, or any other door, frame, or floor surface configuration. In one embodiment, the locking apparatus 100 may be configured to attach to a pressure treated main doorsill plate associated with a foundation of a structure such as a building.

Figure 8:
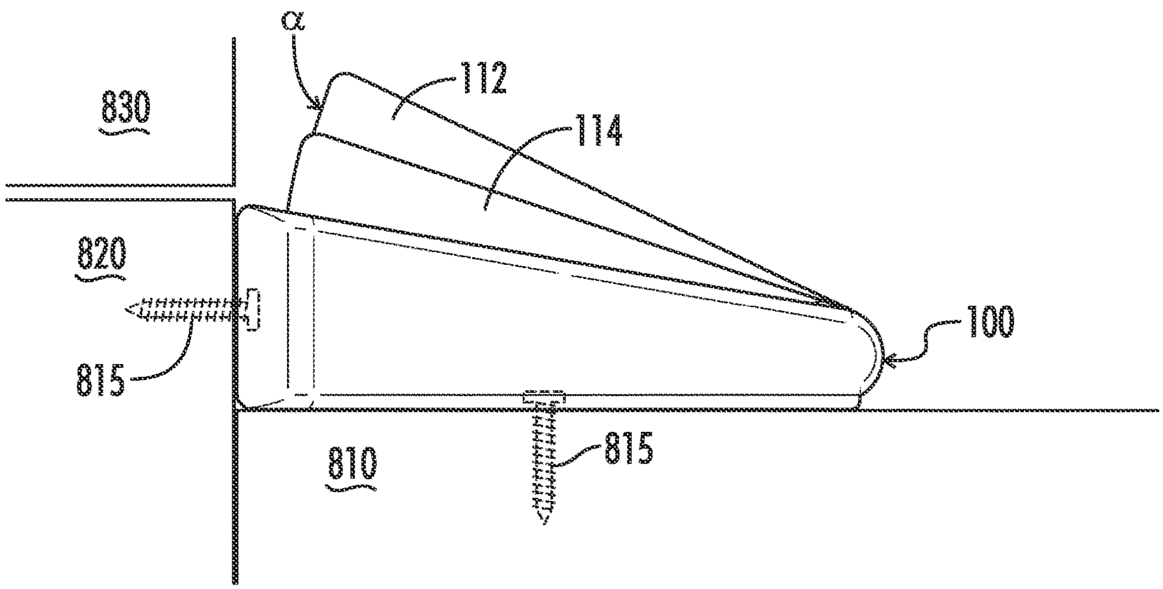
FIG. 8 is a side view of a locking apparatus in a locked state according to an exemplary embodiment.

FIG. 8 illustrates a side view of an exemplary implantation of the present disclosure when the locking apparatus 100 is in a locked state. As illustrated in FIG. 8, a locking apparatus 100 may be mounted upon an intended mounting surface 810 (e.g., an interior floor). In the embodiment illustrated at FIG. 8, the locking apparatus 100 is mounted to the intended mounting surface 810 and/or threshold 820 using at least one fastener 815. At least one surface of the locking apparatus 100 may be optionally placed in contact with threshold 820. Door 830 may be configured to open inwardly toward the locking apparatus 100. When door 830 is opened, it may contact the lifting member 112 of locking apparatus 112 at a contact surface a. As previously described, a height of the contact surface a may be manipulated using riser 600, connection plate 700, or a combination thereof (see FIGS. 6-7), to achieve an optimal contact surface area between the locking apparatus 100 and door 830.

In operation, as the door 830 is placed in contact with the contact surface a, force associated with opening the door inwardly may be translated across the lifting member 112 of the locking apparatus 100 and through the bolts 815 and intended mounting surface 810 and/or threshold 820. By doing so, door opening may be resisted or prevented, and entry may be denied. Furthermore, by providing a floor-mounted locking mechanism, existing entry prevention mechanisms may be enhanced. Because forces received at the contact surface a of locking apparatus 100 are translated into the intended mounting surface 810 and/or threshold 820, forces far exceeding that needed to defeat existing door lock mechanisms may be received by the locking apparatus 100 without permitting entry.

Figure 9:
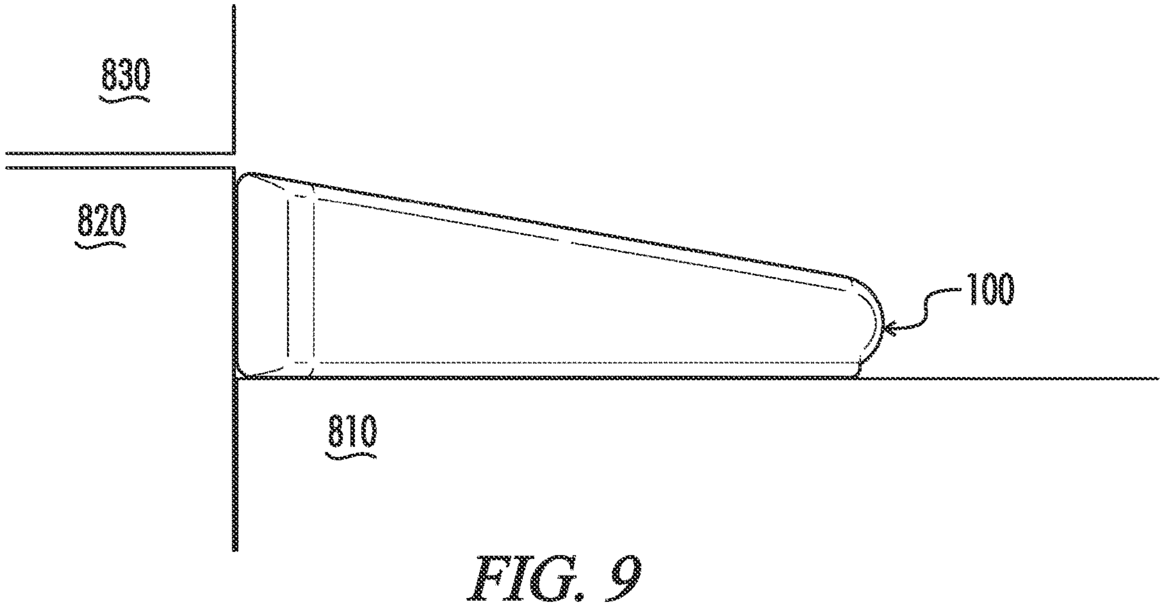
FIG. 9 is a side view of a locking apparatus in an unlocked state according to an exemplary embodiment.

FIG. 9 illustrates a side view of an exemplary implantation of the present disclosure where the locking apparatus 100 is in an unlocked state. As shown in FIG. 9, when the locking apparatus 100 is in an unlocked state, door 830 is free to open inwardly without being placed in contact with contact surface a, since contact surface a is nested within the locking apparatus 100 when operating in the unlocked mode.

Although the present disclosure generally illustrates a floor-mounted locking mechanism, one or more locking apparatuses 100 in accordance with the present disclosure may be implemented at any surface upon which movement of an object to be restrained may be restricted. For example, at least one locking apparatus 100 may be positioned at a vertical portion of a door or window frame or sill and may operate in the same manner as previously described to restrict movement of an object whose movement is intended to be restricted.

Figure 10:
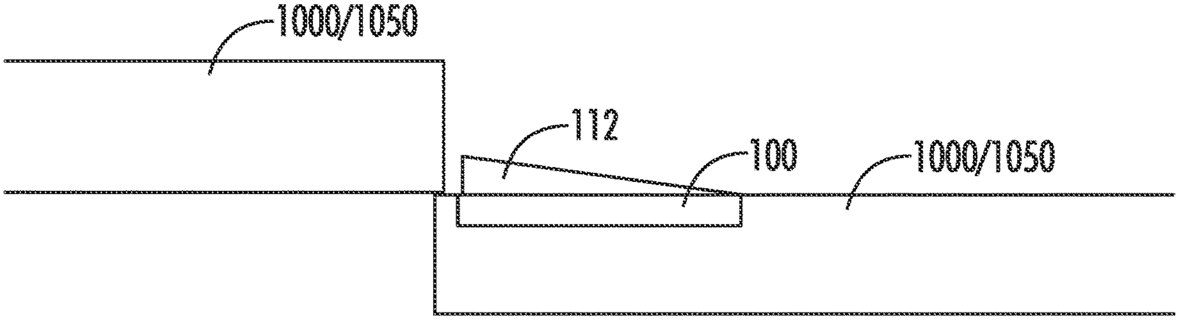
FIG. 10 is an overhead view of a sliding door Implementation of a locking apparatus in a locked state according to an exemplary embodiment.

For example, FIG. 10 illustrates a locking apparatus 100 configured to restrict movement of a sliding door 1000 which moves horizontally relative to a door frame 1050. In this embodiment, the locking apparatus 100 may be positioned such that when lifting member 112 is in a locked state, the sliding door 1000 is blocked from opening by either the sliding door 1000 or frame 1050 being placed in contact with the contact surface a of the locking apparatus 100. As noted in FIG. 10, the locking apparatus 100 may be positioned at either of the sliding door 1000 or frame 1050 in this embodiment to provide a similar or same result.

Figure 11:
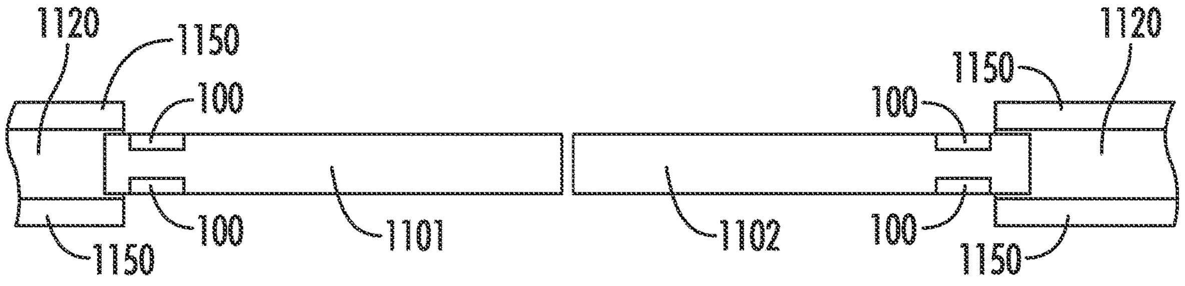
FIG. 11 is an overhead view of a sliding door Implementation of a plurality of locking apparatuses in unlocked states according to an exemplary embodiment.

FIG. 11 illustrates an exemplary embodiment in which sliding doors 1101 and 1102 are configured to open and close by moving along one or more tracks 1120 enclosed by rails 1150. In this exemplary embodiment, one or more locking apparatuses 100 may be implemented at each of sliding doors 1101 and 1102 to restrict movement of the doors along track 1120. For example, sliding doors 1101 and 1102 may be prevented from opening when lifting members 112 of locking apparatuses 100 are in a locked position, as contact between the contact surfaces a of the locking apparatuses 100 and the rails 1150 prevent the sliding doors 1101 and 1102 from moving outwardly along rails 1120.

Figure 12:
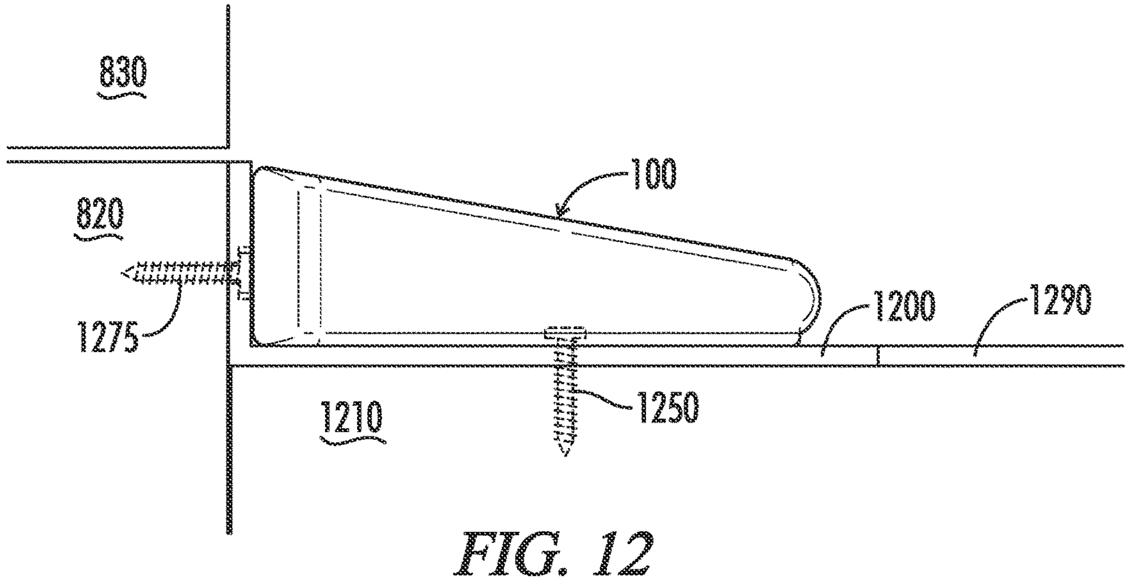
FIG. 12 is a side view of a mounting bracket for a locking apparatus and a locking apparatus according to an exemplary embodiment.

FIG. 12 illustrates a mounting bracket 1200 according to an exemplary embodiment. In one embodiment, the locking apparatus 100 may be attached to a mounting bracket 1200. Alternatively, the locking apparatus may be attached to mounting bracket 1200 at time of installation and mounting to at least one of threshold 820 and surface 1210, for example, by placing a screw, bolt, portion of double sided tape, etc. through at least one opening into which screws 1250 and/or 1275 are placed, as illustrated in FIG. 12. In one embodiment, a carpet or other top surface 1290 may be removed to properly mount the mounting bracket 1200 and locking apparatus 100 to the surface 1210. Although screw 1275 is not illustrated as penetrating through a portion of the locking apparatus 100, it should be understood that both the mounting bracket 1200 and locking apparatus 100 may be secured to the threshold 820 by means of screw 1275, for example by pre-forming a passage through an outer surface of the locking apparatus 100, or by drilling through or otherwise penetrating an outer surface of the locking apparatus 100 either before installing the screw 1275 or at the time of installing screw 1275.

In one embodiment, mounting bracket 1200 may be formed of metal, plastic, glass-filled nylon, or any other material capable of rigidity and durability during operation of the locking apparatus 100. In one embodiment, the connection plate 700 may be formed, at least in part, by a mounting bracket 1200. For example, the connection plate 700 may comprise mounting bracket 1200 attached to or otherwise connected with an extending portion which extends under a door frame or sill.

Figure 13A:
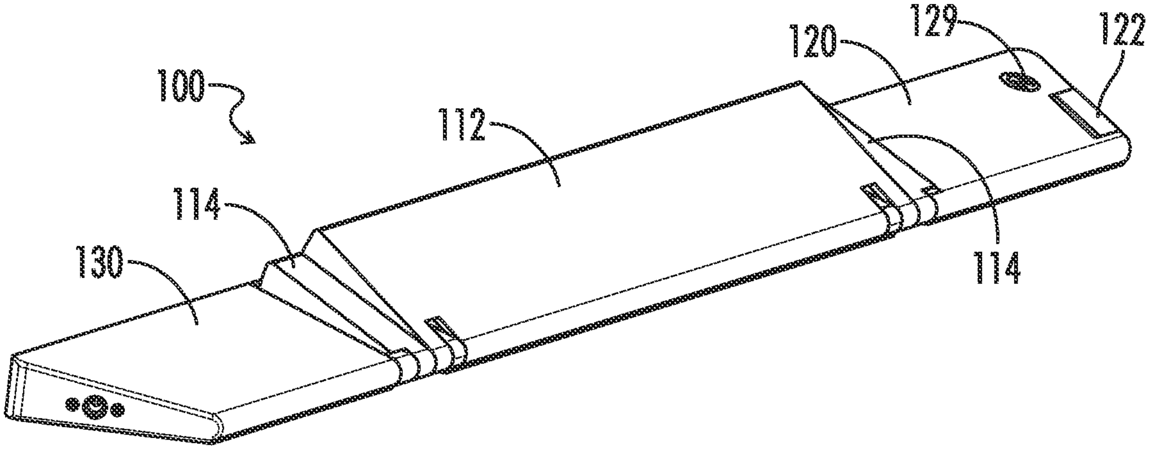
FIGS. 13A-B respectively illustrate a locking apparatus in a locked state and a locking apparatus in an unlocked state according to an exemplary embodiment.
Figure 13B:
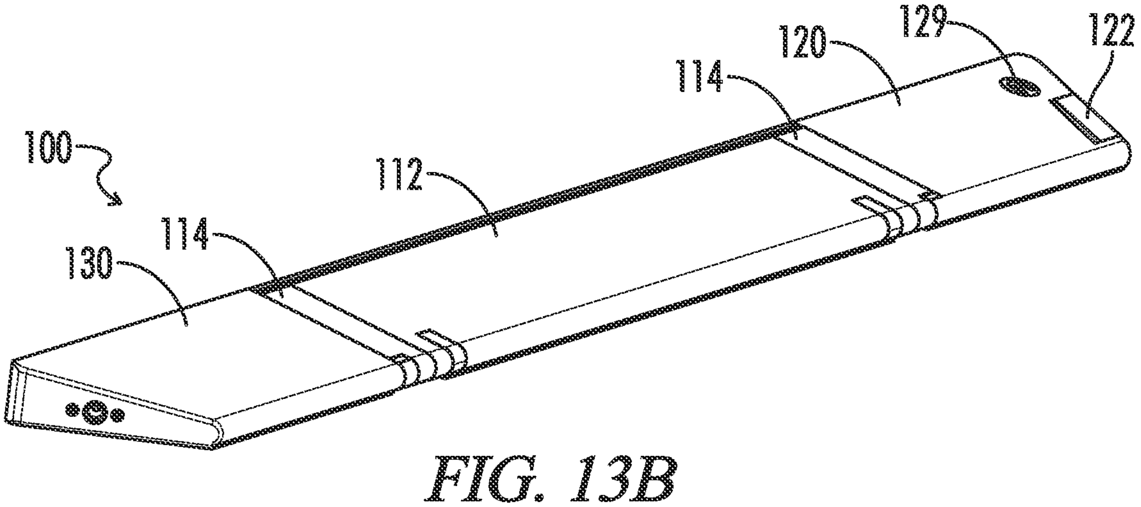

FIGS. 13A-B illustrate a locking apparatus 100 in a locked state (FIG. 13A) and in an unlocked state (FIG. 13B) in accordance with an exemplary embodiment of the present disclosure. In one embodiment, at least a portion of the at least one stop member 114 may be configured to elevate at a same or similar rate to that of lifting portion 112, and may be configured to reach a positional height in a locked state of the lifting portion 112 or at least a portion thereof. Each at least one stop member 114 may be configured to elevate using at least one cam in a similar manner to that of lifting portion 112, or may be connected to lifting portion 112 in a manner which permits a height of the at least one stop member 114 to be manipulated. Although illustrated as comprising a single surface whose height is manipulated, in one exemplary embodiment, the lifting portion may comprise a plurality of lifting sections each having respective contact surfaces with a device whose movement is intended to be restricted.

Figure 14:
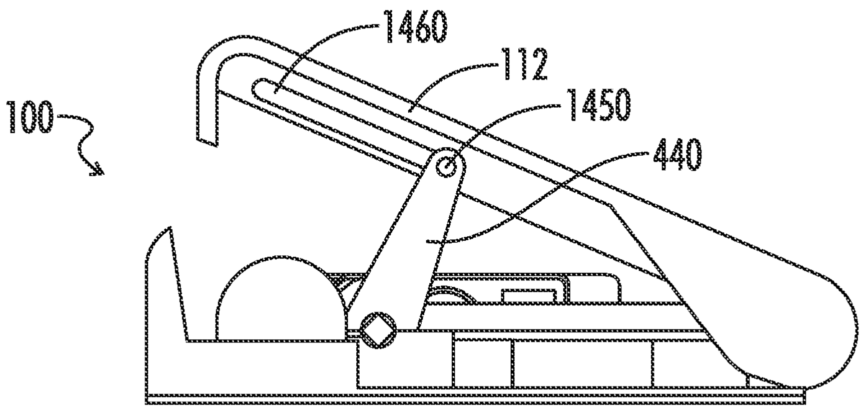
FIG. 14 is a side view of a locking apparatus having a slot-type connection point according to an exemplary embodiment.

FIG. 14 illustrates a side view of a locking apparatus 100 according an exemplary embodiment of the present disclosure. In the embodiment illustrated by FIG. 14, at least one cam 440 may be configured with a connector 1450 at a surface thereof. The connector 1450 may be configured to be received by and connected to a slot 1460 located at an interior surface of the lifting portion 112. In one embodiment, connection between the connector 1450 and slot 1460 may permit the at least one cam 440 to control both lifting and lowering of a height associated with the lifting portion 112. By placing the connector 1450 into the slot 1460, movement of the cam 440 may cause a position of the connector 1450 within the slot 1460 to move such that at least one of a lifting motion and a lowering motion is achieved based on movement of the cam 440.

Figure 15:
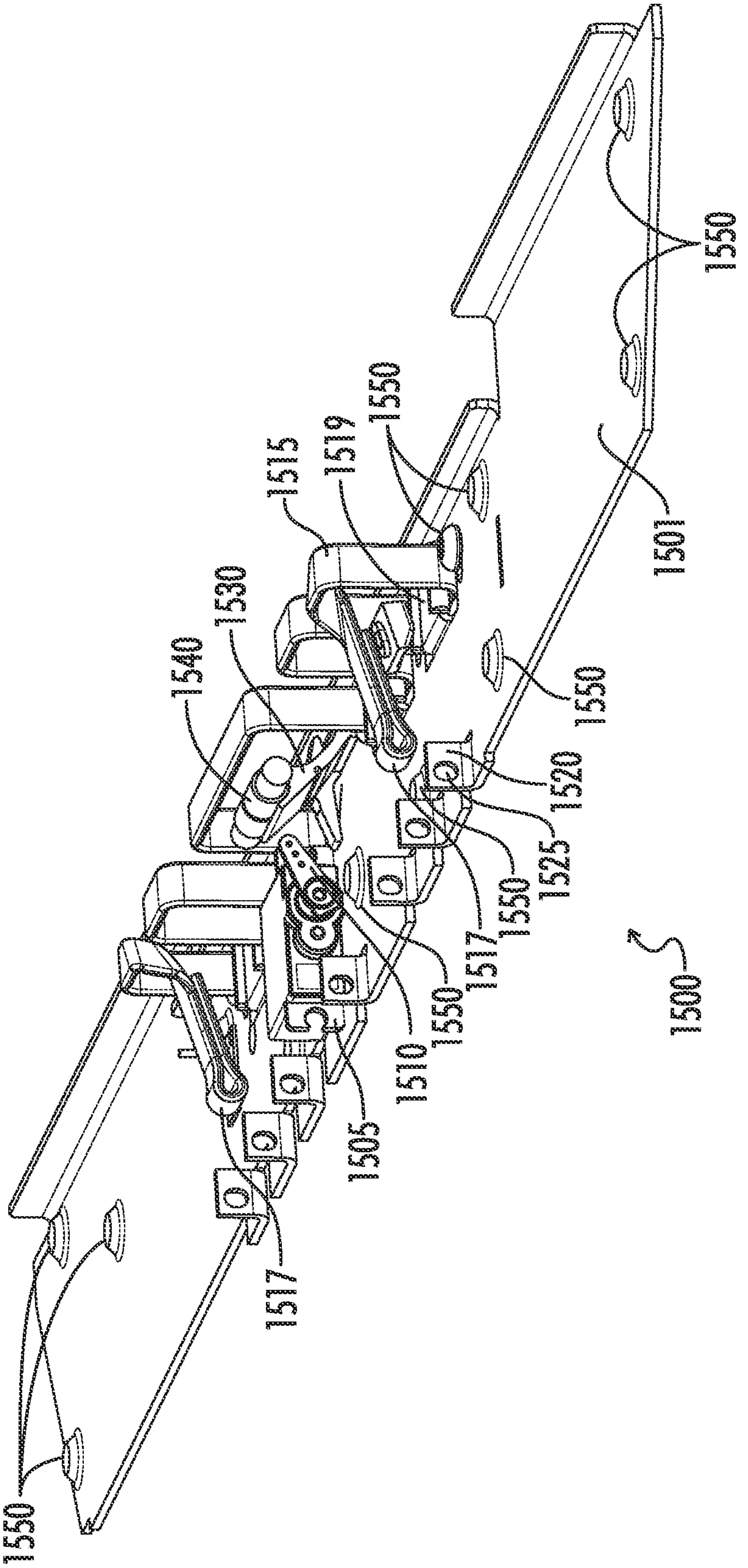
FIG. 15 illustrates a partial internal view of a central member of a locking apparatus according to an exemplary embodiment.

FIG. 15 illustrates a partial internal view of an exemplary embodiment of a central member 1500 of a locking apparatus. Connected to a bottom portion 1501 of the central member 1510 may be at least one actuator 1505. In various embodiments, the actuator 1505 may be equivalent to the actuator 405 previously described herein. The actuator 1505 is configured in one embodiment to connect to at least one lifting arm 1510. The lifting arm 1510 is configured to translate rotational movement output from the actuator 1505 to cause at least one of contact with a surface of a lifting member 112 (not illustrated in FIG. 15) of a central member 1500 and movement of the lighting member 112 via the lifting arm 1510.

At least one adjustment member 1515 may be connected one or more contact points of the central member 1500. In one exemplary embodiment, the adjustment member 1515 may comprise a material capable of flexing and translating forces received at the adjustment member 1515. The adjustment member 1515 may take the form of any substance or material capable of being placed in tension (such as, for example, a nylon strap, nylon webbing, rubber material, plastic material, a flexible woven, nonwoven, or textile member, etc.). In one exemplary embodiment, the adjustment member 1515 is a flexible woven or textile strap. However, the adjustment member 1515 is capable of taking the form of any segment, strand, or portion of material capable of receiving and/or transmitting one or more forces (e.g., a rope, string, or strand of material, a segment or portion of substance, etc., without departing from the spirit and the scope of the present disclosure.

The adjustment member may include one or more contact terminals 1517. Each contact terminal 1517 is configured to connect to at least a portion of the central member 1500. For example, one or more contact terminal 1517 may be configured to connect to a corresponding pin located at a lifting member 112 associated with the central member 1500. The adjustment member 1515 and central member 1500 are configured in one exemplary embodiment such that at least a portion of the adjustment member 1515 is wound or wrapped around a portion of a contact surface of the central member 1500. For example, as illustrated in FIG. 15, the adjustment member 1515 may be wound through one or more apertures 1519 in a portion of the central member 1500. The adjustment member 1515 is configured to connect to the lifting member 112 at two contact terminals 1517 while also being looped through one or more apertures 1519 in the exemplary embodiment illustrated by FIG. 15. By doing so, the adjustment member is placed in tension and may absorb and translate forces received at one or more portions of the central member 1500.

The central member 1500 may comprise at least one dog 1530. In one exemplary embodiment, dog 1530 is configured to connect to a surface of the bottom portion 1501. The dog 1530 may be rotatively coupled to a dog leg (e.g., latch), the dog leg being configured to restrict or stop movement of the dog 1530 in at least one direction. The dog 1530 includes a contact means 1540, for example at an end of the dog 1530 opposite to that connected to the bottom portion 1501. The contact means 1540 may variously comprise one or more connection mechanisms configured to be placed in contact and/or remain in contact with a surface of the lifting member 112 during operation. For example, the contact means 1540 may take the form of a pin, a roller, a bearing, or the like, without departing from the spirit and the scope of the present disclosure. In one exemplary embodiment, the contact means 1540 may be connected to the lifting member 112, for example using a pin as illustrated in FIG. 15.

The central member 1500 is configured in one exemplary embodiment such that as the lifting member 112 is raised relative to the bottom portion 1501, the dog 1530 rotates outwardly relative to the bottom portion 1501. The dog leg of the dog 1530 may be configured to limit or restrict movement of the dog 1530 in a direction opposite to the outward direction (e.g., based on a locking position, an incremental position, or the like). In one embodiment, the dog 1530 is configured with a release such that, based at least in part upon either manual or automated input, the dog 1530 is capable of releasing so as to allow the lifting member 112 to lower towards to the bottom portion 1501. The dog 1530 may be variously configured at least in part upon a desired or predetermined amount of weight or force received in a direction towards to the bottom portion 1501 to cause the dog 1530 to release the dog leg and permit the lifting member 1530 to lower. For example, the dog 1530 may be configured to release if a weight greater than that of the lifting member 112 is received at the dog 1530, may be configured to release if the weight received at the dog 1530 is greater than 25 pounds, 50 pounds, 75 pounds, 100 pounds, or any other dynamically determined or predetermined criteria.

The central member 1500 may further comprise at least one tab 1520. The tab 1520 may comprise at least one opening 1525. The opening 1525 in one exemplary embodiment is configured to correspond with a pin configured to be received through the opening 1525. Each tab 1520 and opening 1525 is configured to correspond with at least one tab or opening of the lifting member 112 such that the central member 1500 and lifting member 112 are capable of being connected to one another via the pin.

The central member 1500 may further comprise at least one mounting point 1550. The central member 1500 may be attached to a surface using any one of at least one bolt, at least one hook and loop fastener, an adhesive material (e.g., any double sided tape, a tape such as 3M™ VHB™, etc.), or any other means of attachment, either alone or in combination, received via the at least one mounting point 1550. Furthermore, the means of attaching the central member 1500 to a surface may be located upon at least one surface of the central member 1500, a surface upon which it is intended to be mounted, or any combination thereof. In one exemplary embodiment, the central member 1500 may comprise at least one opening at the bottom portion 1501 which may be used to mount the central member to a mounting location by placing a bolt, screw, nail, tape, or other affixing element into or through the at least one opening and into or onto the surface upon which the central member 1500 is to be mounted. Optionally, the at least one opening may be provided by means of a mounting bracket configured to be placed between the central member 1500 and mounting surface during installation.

Figure 16:
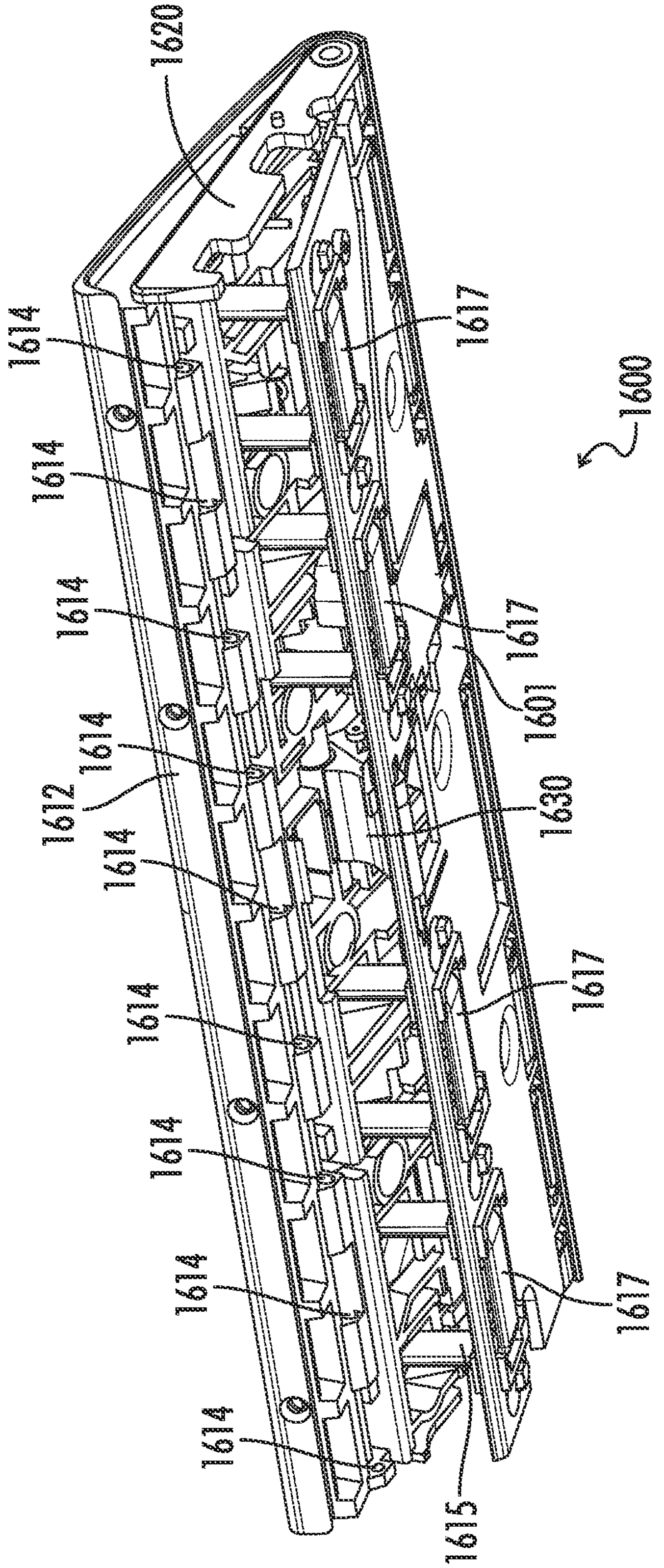
FIG. 16 illustrates a partial bottom perspective view of a central member in according to an exemplary embodiment.

FIG. 16 illustrates a partial bottom perspective view of a central member 1600 in accordance with an exemplary embodiment. Central member 1600 comprises a bottom portion 1601 and a lifting member 1612. In the embodiment illustrated by FIG. 16, the bottom portion 1601 may be equivalent to the previously described bottom portion 1501 and the lifting member 1612 may be equivalent to the previously described lifting member 112. The central member 1600 may comprise an adjustment member 1615 configured to connect the bottom portion 1601 and lifting member 1612. The adjustment member 1615 may be configured to pass through one or more apertures 1617 of the bottom portion 1601. At least a portion of the adjustment member 1615 may be configured to similarly pass through one or more apertures of the lifting member 1612 (e.g., in the manner illustrated at FIG. 18).

The central member 1600 may include at least one dog 1630 similar to that described above with reference to dog 1530. The lifting member 1612 may comprise at least one opening 1614. The opening 1614 may be configured to receive one or more pins configured to pass through at least a portion of the at least one opening 1614. In one exemplary embodiment, the lifting member 1612 may be configured to connect to one or more hinges to interconnect the lifting member 1612 and bottom portion 1601 of the central member 1600 (e.g., in the manner illustrated by FIG. 19). The central member 1600 may comprise at least one stop member 1620 located at an end thereof. In various embodiments, the stop member 1620 may function as previously described with reference to stop member 114.

Figure 17:
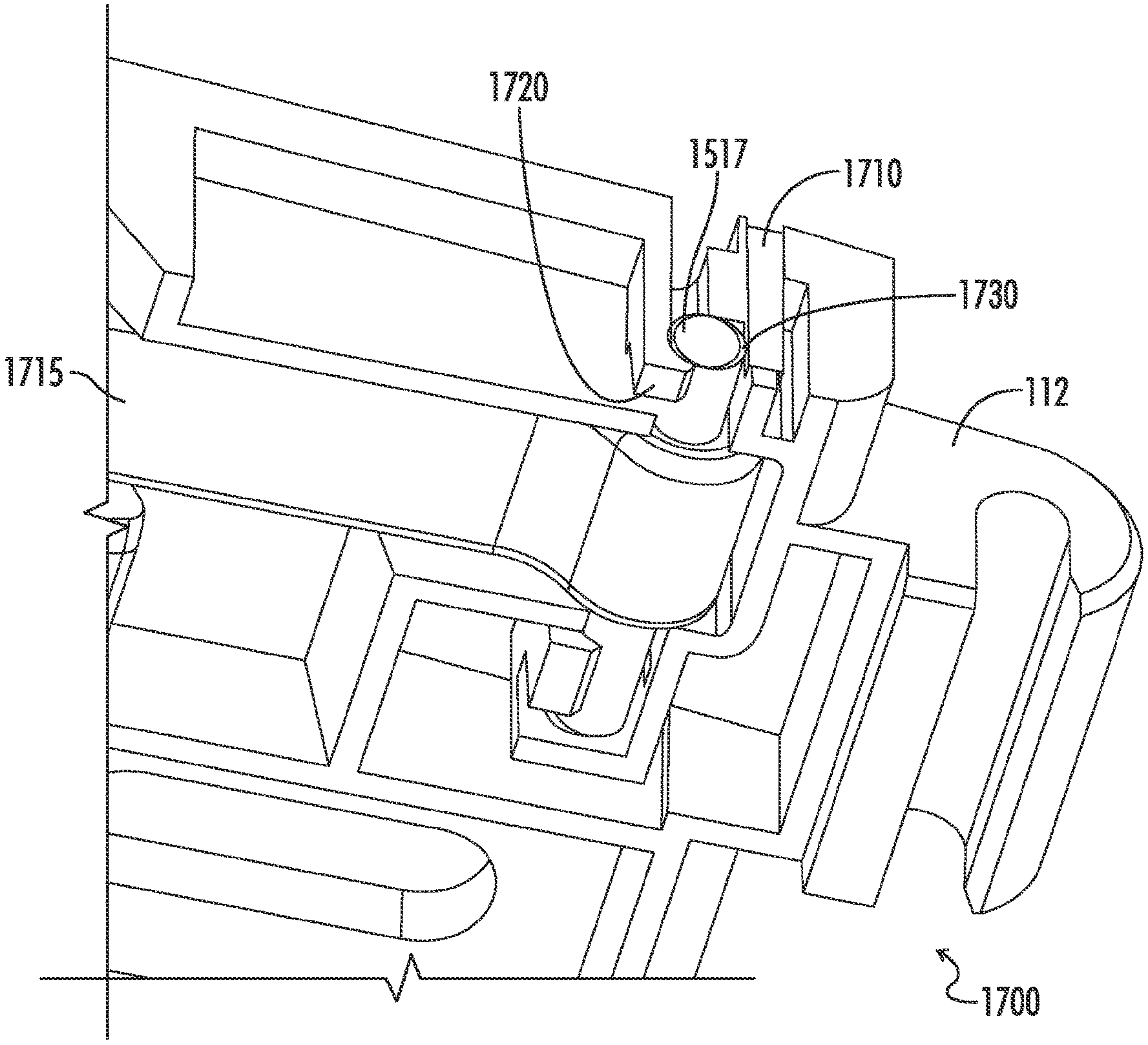
FIG. 17 illustrates a zoomed view of a partial internal view of a central member according to an exemplary embodiment.

FIG. 17 illustrates a zoomed view of a partial internal view of a central member 1700 according to an exemplary embodiment. The central member 1700 comprises a lifting member (e.g., lifting member 112) having an adjustment member 1715 configured in the manner previously described (e.g., with reference to adjustment members 1515, 1615). The central member 1700 may include one or more contact terminals 1517 passing at least partially through an adjustment member 1715. Each contact terminal 1517 may have a contact surface 1730 configured to be placed in contact with a conductive contact surface 1710 located at the lifting member 112. Each conductive contact surface 1710 may further comprise at least one conductive path, for example connecting the conductive contact surface with a control circuit, such as a printed circuit board associated with the locking apparatus (e.g., control circuit 450). One or more conductive paths may be configured to be shared between a plurality of conductive terminal contacts in one embodiment.

In operation, the control circuit may be configured to detect a force received by the locking apparatus by detecting a contact status between one or more contact terminals 1517 and one or more conductive contact surfaces 1710. For example, in one embodiment the control circuit may be configured to detect a disconnected status between a contact terminal 1517 and conductive contact surface 1710. Based at least in part upon the detected disconnected status, the control circuit may determine that an attempted entry has occurred and may contact at least one of a user, a homeowner, a landlord, a renter, a police representative, a security company, or any other entity having an interest in an attempted entry while the locking apparatus is maintained in a locked state. The lifting member 112 may be configured with one or more receiving portions 1720, each receiving portion being configured to receive at least a portion of a contact terminal 1517 corresponding to an adjustment member 1715.

Figure 18:
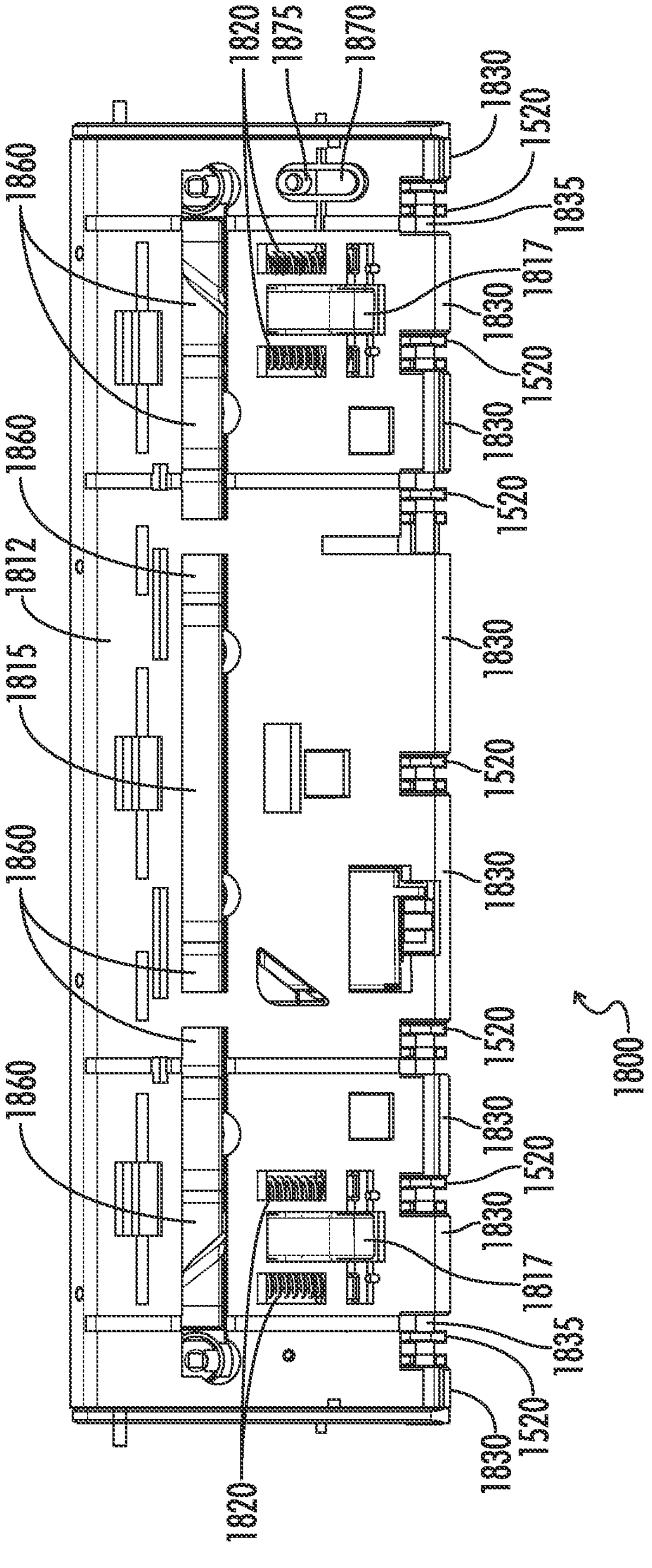
FIG. 18 illustrates a partial top elevational view of a central member according to an exemplary embodiment.

FIG. 18 illustrates a partial top elevational view of a central member 1800 according to an exemplary embodiment. The central member 1800 includes at least a lifting member 1812 connected to a bottom portion (e.g., bottom portion 1501) via the at least one passage 1830 formed on the lifting member 1812. At least one shaft 1835 is configured to pass through the passage 1830 and at least one tab 1520 of the bottom portion. In one exemplary embodiment, the lifting member 1812 and the bottom portion (e.g., bottom portion 1501) are connected via a hinge created via the shaft 1835 passing through the at least one passage 1830 of the lifting member 1812 and the at least one tab 1520 of the bottom portion.

The central member 1800 comprises at least one adjustment member 1815. The adjustment member 1815 may be connected to the bottom portion (e.g., bottom portion 1501) in the manner previously described. The adjustment member 1815 may further be connected to the lifting member 1812 via one or more apertures 1860. For example, the adjustment member 1815 may be wound through a plurality of apertures 1860 located at one or more surfaces of the lifting member 1812, as illustrated in the embodiment provided in FIG. 18.

The adjustment member 1815 may include one or more contact terminals 1817. Each contact terminal 1817 is configured to connect to at least a portion of the central member 1800. For example, one or more contact terminal 1817 may be configured to connect to a corresponding pin located at a lifting member 1812 associated with the central member 1800. The adjustment member 1815 and central member 1800 are configured in one exemplary embodiment such that at least a portion of the adjustment member 1815 is wound or wrapped around a portion of a of the bottom portion (e.g., bottom portion 1501). For example, as illustrated in FIG. 15, the adjustment member 1515 may be wound through one or more apertures 1519 in a portion of the central member 1500. The adjustment member 1815 is configured to connect to the lifting member 1812 at two contact terminals 1817 while also being looped through one or more apertures 1519 in the exemplary embodiment illustrated by FIG. 15. By doing so, the adjustment member is placed in tension and may absorb and translate forces received at one or more portions of the central member 1800.

The central member 1800 may comprise at least one resilience member 1820 associated with the adjustment member 1815. In one embodiment, each resilience member 1820 comprises an element configured to receive, transmit, or receive and transmit one or more forces applied to the adjustment member 1815. Each resilience member 1820 is configured to connect to at least one surface of the lifting member 1812 and to translate one or more forces through the resilience member 1820.

By incorporating a flexible adjustment member 1815 with the resilience members 1820, implementations consistent with the present disclosure are capable of manipulating a contact surface angle of the lifting member 1812 relative to an object whose movement is intended to be impeded or restricted (such as a door, window, etc.). For example, an opening door maintains a circular path in an opening direction. The present disclosure provides a locking apparatus contact surface capable of adjusting to maintain contact with a door through at least a portion of a door opening path based on at least one of flexibility of the adjustment member 1815 and at least one resilience member 1820. Thus, whereas a non-adjustable contact surface provides a reduced contact surface and thus increased centralized force on both the door and the locking apparatus at the reduced contact surface, the present disclosure permits a more evenly-distributed force across the lifting member, thereby reducing negative effects of focused energy on both the door and the locking apparatus. In embodiments where the resilience member 1820 is a spring, the spring's motion permits rotation of the lifting member 1812 such that the entire front (contact) edge of the lifting member 1812 may be placed in contact with a contact surface of the door in order to more efficiently transfer energy to protect the door. The adjustment member 1815 may be configured both to manipulate a position of the lifting member 1812 and to focus energy received from an object when the locking apparatus is operating in a locked position, similar to a spring function. The spring motion also permits rotation of the lifting member 1812 such that the entire front edge of the lifting member 1812 may be placed in contact with a contact surface of the object in order to more efficiently transfer energy to protect the object.

In various exemplary embodiments, the lifting member 1812 may be configured to rotate without using the at least one resilience member 1820. For example, the lifting member 1812 may be connected to the central member 1800 via the adjustment member 1815 alone. The adjustment member 1815 may take the form of an adjustment member 1515, as previously described herein, and the adjustment member 1815 may be configured to provide both energy absorption and tilt or rotation of the lifting member 1812 in a manner at least similar to that previously described herein.

The central member 1800 may include a selector 1870. In one exemplary embodiment, the selector 1870 comprises an opening through a portion of the lifting member 1812. The selector 1870 may comprise a toggle 1875. The toggle 1875 may take the form of a moveable portion configured to move within the opening of the selector 1870. In one exemplary embodiment, the toggle 1875 is configured to correspond to manual locking mode criteria. For example, the toggle 1875 may be defined with two positions relative to the selector 1870, one position corresponding to manual operation, and one position corresponding to automated operation. The position of the toggle 1875 is configured to be set either at the time of manufacturing, or may be dynamically manipulated (e.g., by an installer or purchaser) after the time of manufacturing. In one exemplary manner of operation, a user of a locking apparatus consistent with the embodiment illustrated at FIG. 18 is capable of causing the lifting member 1812 to elevate to a locked position using a lifting selector associated with a pedal as described, for example, with reference to FIG. 19.

When the toggle 1875 is in a manual operation mode position and an input is received from a user at the pedal of the locking apparatus, the lifting member 1812 may be caused to elevate to a locked position. A manual unlocking mechanism may be variously implemented, but in one embodiment may be performed by providing a downward force, pressure, or weight upon at least a portion of the locking apparatus (e.g., by stepping downward upon an elevated lifting member 1812). Optionally or alternatively, a locking apparatus consistent with the present disclosure may be transitioned from a locked state to an unlocked state by providing an input to the locking apparatus (e.g., by depressing a pedal associated with the locking apparatus). The exemplary pedal may comprise a single pedal for both locking and unlocking the locking apparatus, or a plurality of pedals may be provided, for example including one lifting pedal and one lowering pedal, without departing from the spirit and the scope of the present disclosure.

Figure 19:
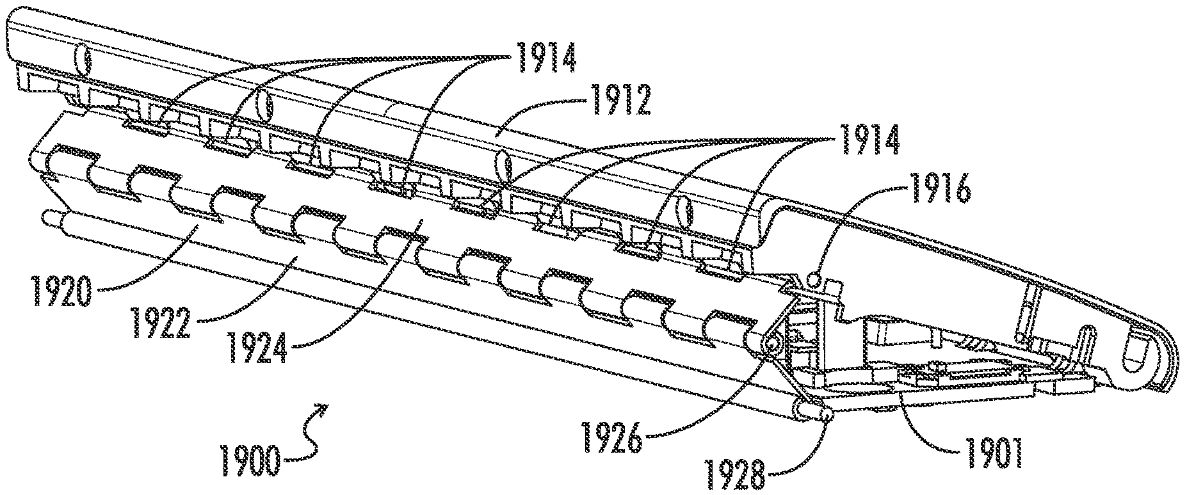
FIG. 19 illustrates a raised perspective view of a portion of an internal view of a central member according to an exemplary embodiment.

FIG. 19 illustrates a raised perspective view of a portion of an internal view of a central member 1900 according to an exemplary embodiment. The central member 1900 includes at least a bottom portion 1901 and lifting member 1912. Each of the bottom portion 1901 and lifting member 1912 may take the form of the previously described bottom portion and lifting member without departing from the spirit and the scope of the present disclosure.

The central member 1912 may further comprise a hinge 1920. In one exemplary embodiment, the hinge 1920 may comprise a lower portion 1922 and an upper portion 1924 being connected via at least one pin 1926. Alternatively, the hinge 1920 may take the form of a unibody hinge, without the need for the pin 1926. The upper portion 1924 of hinge 1920 may be configured to connect to the lifting member 1912 via at least one pin 1916, with at least a portion of at least one pin 1916 being configured to be received at one or more apertures 1914 at the lifting member 1912. The lower portion 1922 of the hinge 1920 may be configured to connect to the bottom portion 1901 in one embodiment via at least one pin 1928. The at least one pin 1928 may be configured in one embodiment to pass through at least a portion of the bottom portion 1901 (e.g., through the at least one opening 1525 of tab 1520 as previously described).

Figure 20:
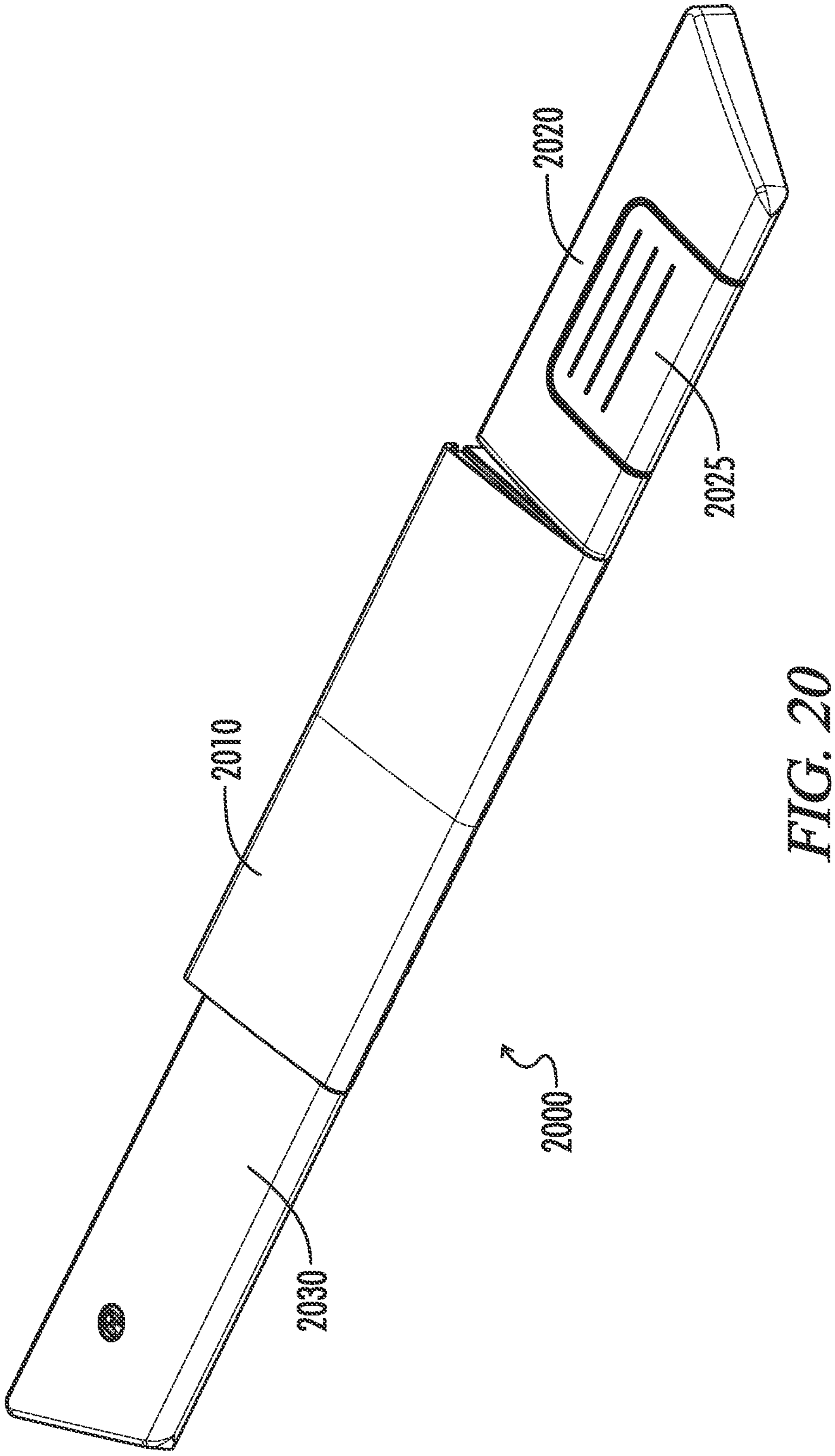
FIG. 20 illustrates a top perspective view of a locking apparatus according to an exemplary embodiment.

FIG. 20 illustrates a top perspective view of an exemplary embodiment of a locking apparatus 2000. The locking apparatus may comprise one or more of a central member 2010, an outer housing 2020, and a power housing 2030. The outer housing may comprise a pedal 2025 for enabling manual operation (e.g., as previously described herein with reference to the push/pull type mechanism and foot pedal 54 and associated structure described in Provisional Patent Application 62/038,393 (as incorporated by reference herein in its entirety).

Figure 21:
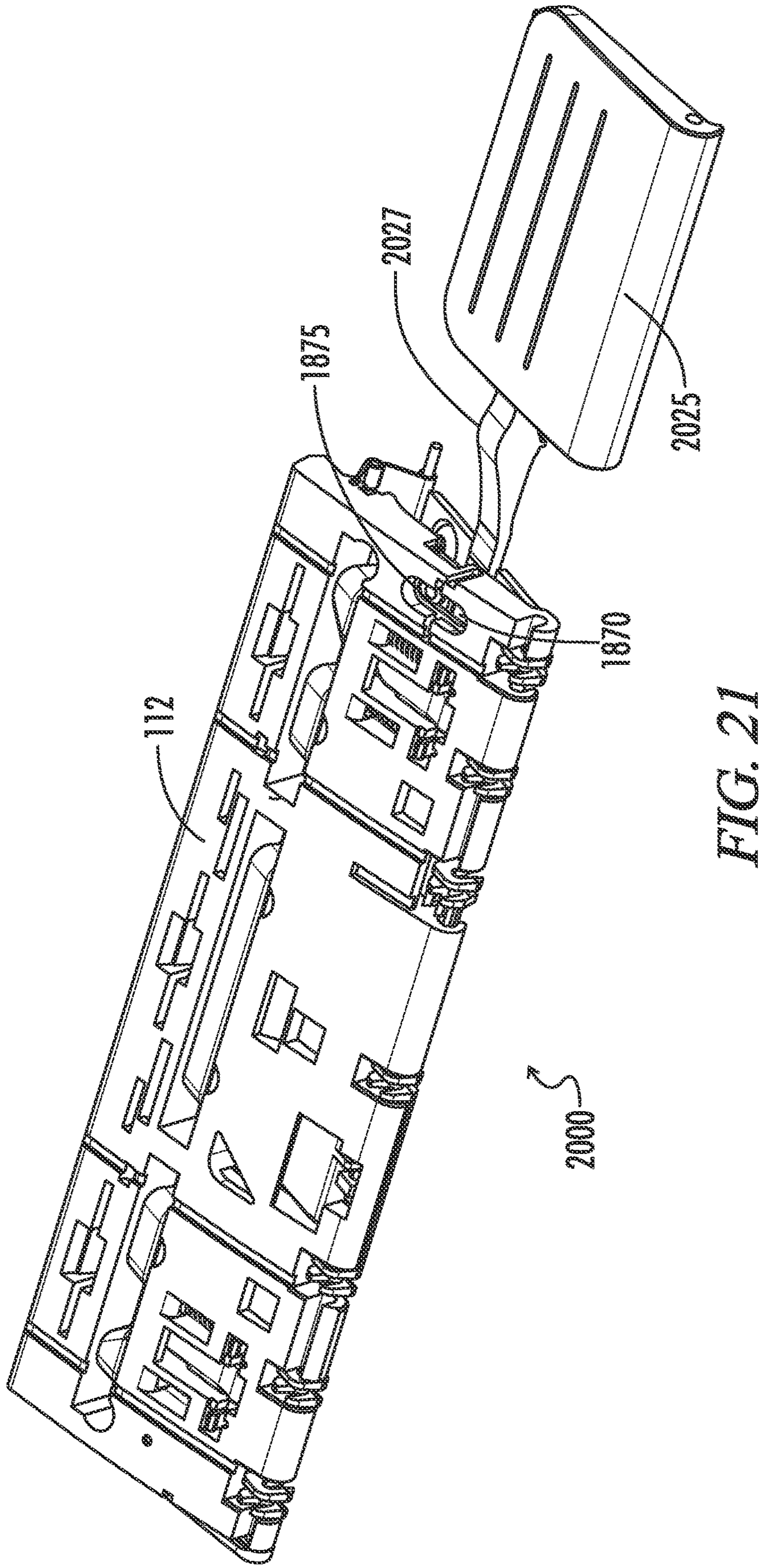
FIG. 21 illustrates a perspective view of a partial internal view of a central member and an outer housing of a locking apparatus according to an exemplary embodiment.

FIG. 21 illustrates an exemplary embodiment of a locking apparatus showing a perspective view of a partial internal view of a central member 2010 and outer housing 2020 in accordance with the present disclosure. The pedal 2025 may be configured to contact a manual operation engager 2027. In one exemplary embodiment, the manual operation engager 2027 comprises a level configured to adjust a physical position based upon the presence or absence of contact with a surface of the pedal 2025. For example, the manual operation engager 2027 may be positioned relative to a pivot and the pedal 2025, where contact with the pedal 2025 causes at least a portion of the manual operating engager 2027 at an end opposite to the pedal 2025 to raise or lower within a portion of the central member 2000. If the toggle 1875 within the selector 1870 restricts movement of the manual operating engager 2027, manual operation may be prevented. Manual operation may be enabled when a position of the toggle 1875 corresponds to a manual operation mode, and movement of the manual operating engager 2027 when the pedal 2025 is manipulated by a user may cause the lifting portion 112 to raise or lower as previously described herein (e.g., based at least in part upon contact between the manual operating engager 2027 and a surface of the lifting portion 112.

With reference to FIGS. 22-33, provided is a locking apparatus 2300 in accordance with exemplary embodiments of the present disclosure. The locking apparatus 2300 may function similar to and include elements, such as the central member 100, the power housing 130, and the control circuit 450, which function as disclosed above and shown in FIGS. 1-21. Generally, the immediately following disclosure will focus on new elements of the locking apparatus 2300 shown in FIGS. 22-33. The locking apparatus 2300 is configured to be coupled directly to the openable element 10 (shown in FIGS. 22, 24, 28, and 30) and function in combination with a stop plate 2320 of the locking apparatus 2300 coupled to a frame 20 surrounding the openable element 10. The stop plate 2320 may be aligned with at least a portion of the lifting member 112 of the central member 110 for restricting movement of the openable element 10 when the lifting member 112 is raised.

The locking apparatus 2300 may include a mounting bracket 2310 configured to couple the central member 100 to the openable element 10. As illustrated in FIGS. 25, 26, 31, and 32, the mounting bracket 2310 may include a mounting portion 2312 and a support portion 2314. The mounting portion 2312 may be configured to be coupled to the openable element 10. The mounting portion 2312 may be oriented perpendicular to the support portion 2314. Each of the central member 110 and the power housing 130 may be configured to be coupled to the support portion 2314 of the mounting bracket 2310. The support portion 2314 may include an upper surface 2316 and a lower surface 2318. The central member 110 may be configured to be coupled to the upper surface 2316 of the support portion 2314 of the mounting bracket 2310. The power housing 130 may be configured to be coupled to the lower surface 2318 of the support portion 2314 of the mounting bracket 2310.

The locking apparatus 2300 may further include a housing 2330 configured to be coupled to the mounting bracket 2310. The housing 2330 may at least partially surround the mounting bracket 2310 and the central member 110. The housing 2330 may include an upper opening configured to allow access to and movement of the lifting member 112 for enabling interaction between the lifting member 112 and the stop plate 2320.

As illustrated in FIGS. 22, 24, 28, and 30, the openable element 10 may include a hinged edge 12 and a free edge 14 positioned opposite the hinged edge 12. The hinged edge 12 may be coupled to the frame 20. The mounting bracket 2310 may be configured to be coupled closer to the free edge 14 than to the hinged edge 12. The openable element 10 may further include an upper edge portion 16. The mounting bracket 2310 may be configured to be coupled along the upper edge portion 16 of the openable element 10.

Figure 22:
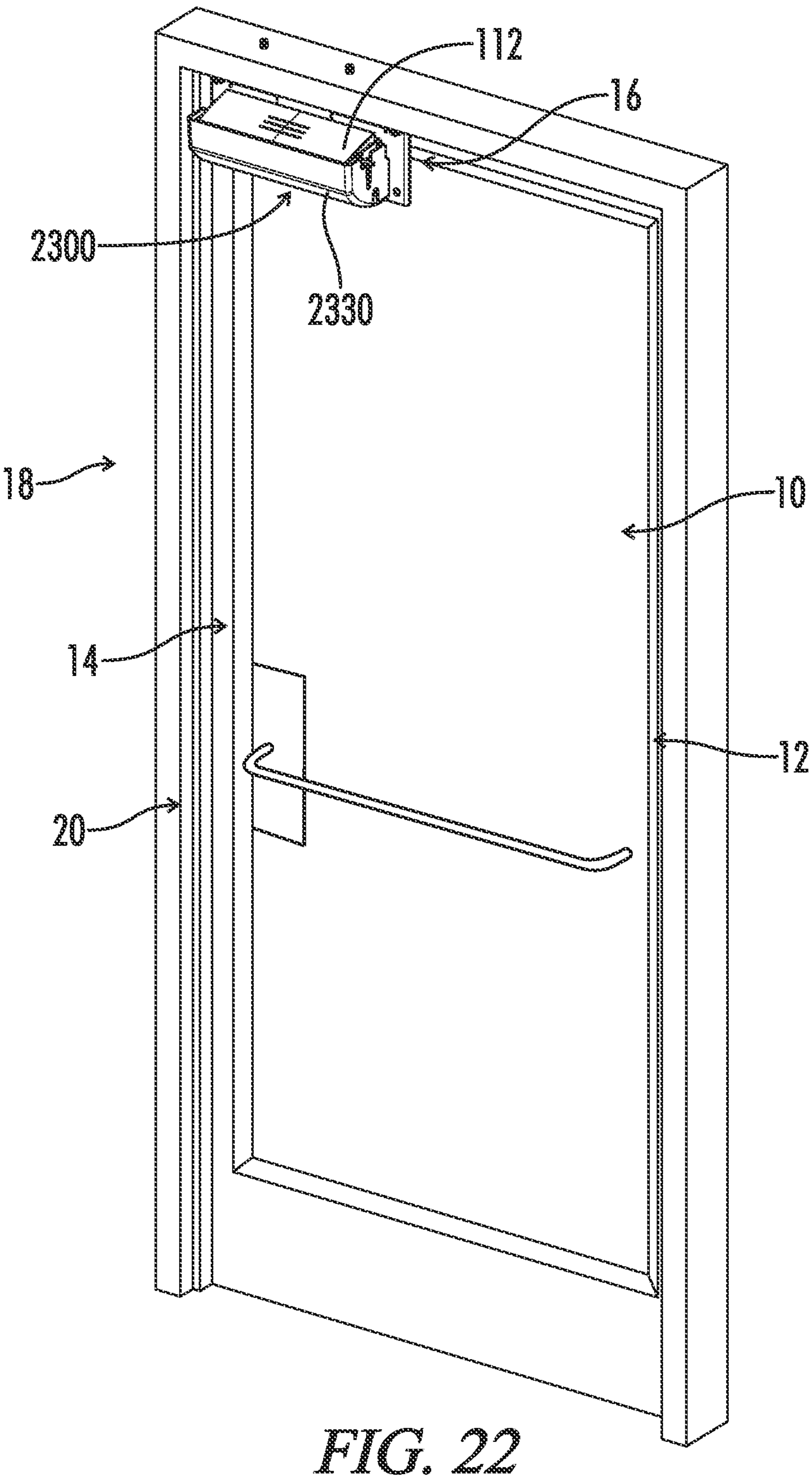
FIG. 22 illustrates a perspective view of a locking apparatus according to an exemplary embodiment mounted to an openable element.
Figure 24:
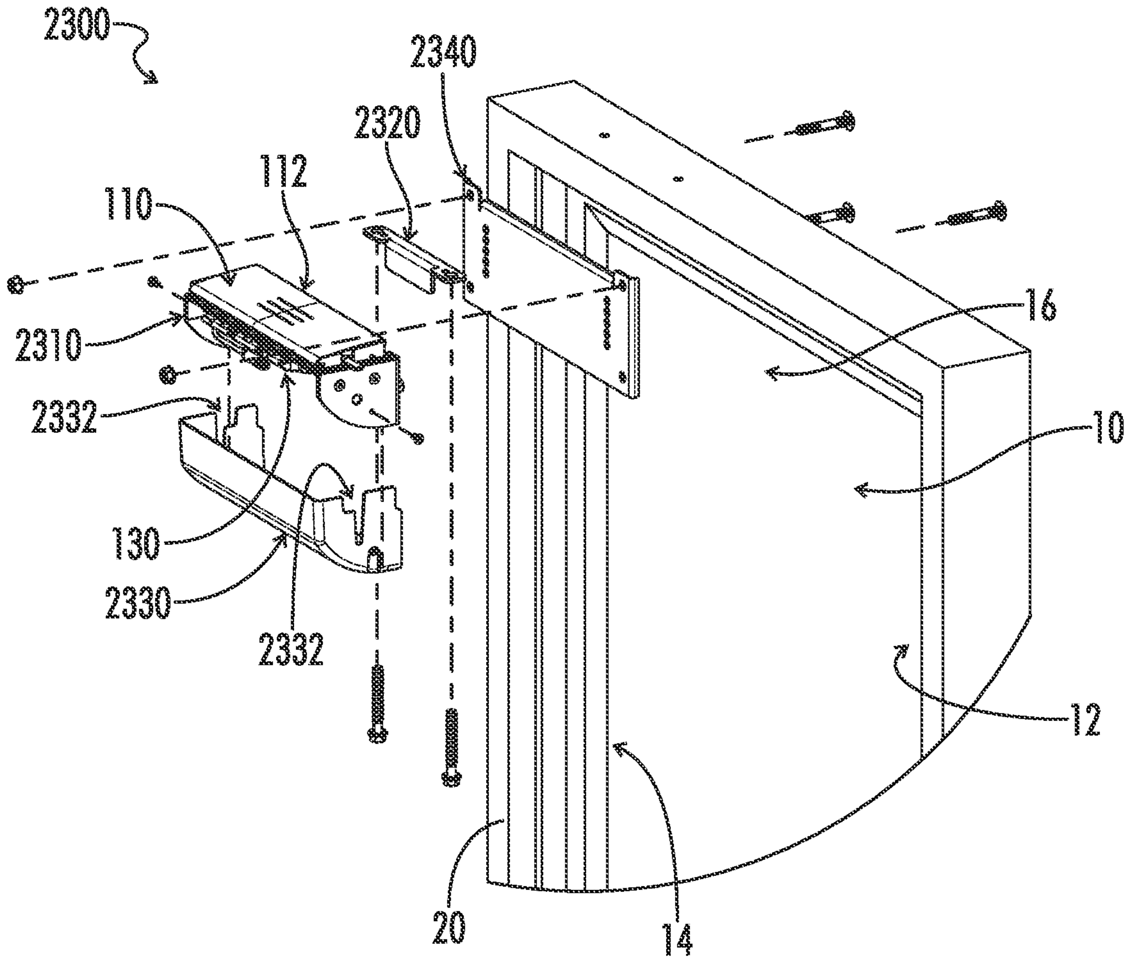
FIG. 24 illustrates an exploded perspective view of a locking apparatus according to an exemplary embodiment.
Figure 25:
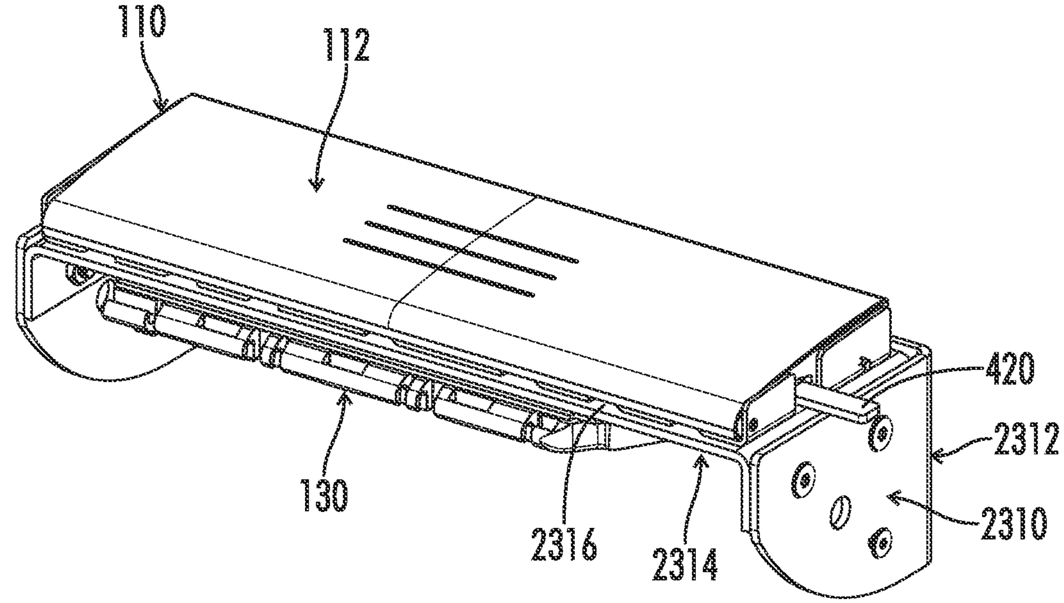
FIG. 25 illustrates an upper perspective view of a central member of a locking apparatus according to an exemplary embodiment.
Figure 26:
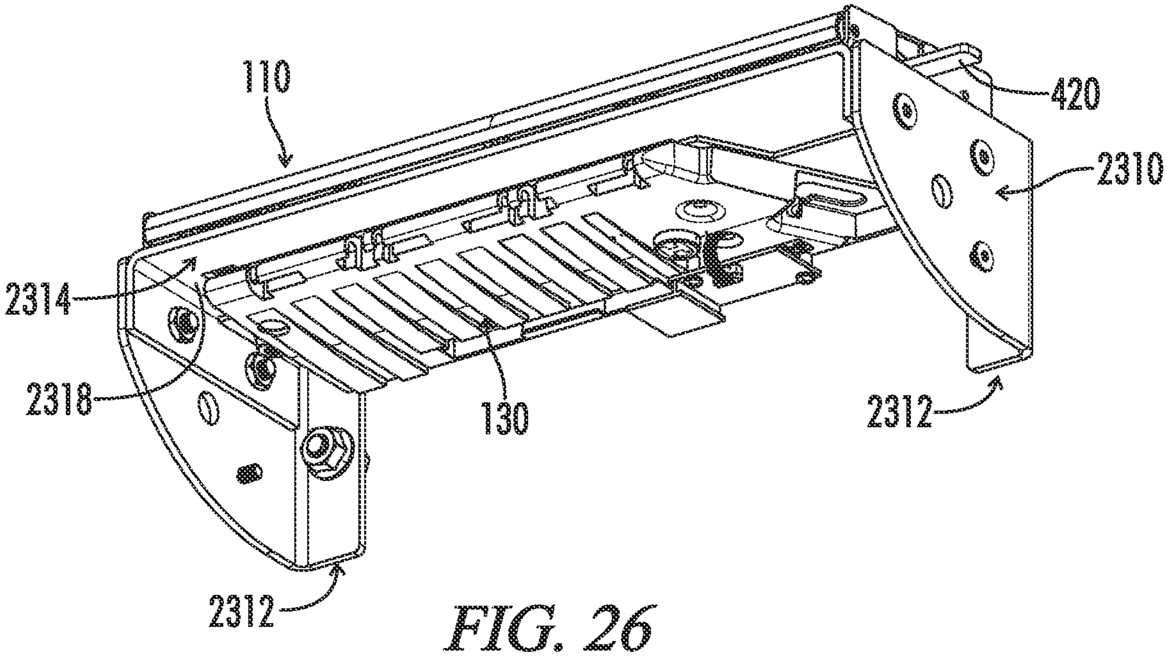
FIG. 26 illustrates a lower perspective view of a central member of a locking apparatus according to an exemplary embodiment.
Figure 27:
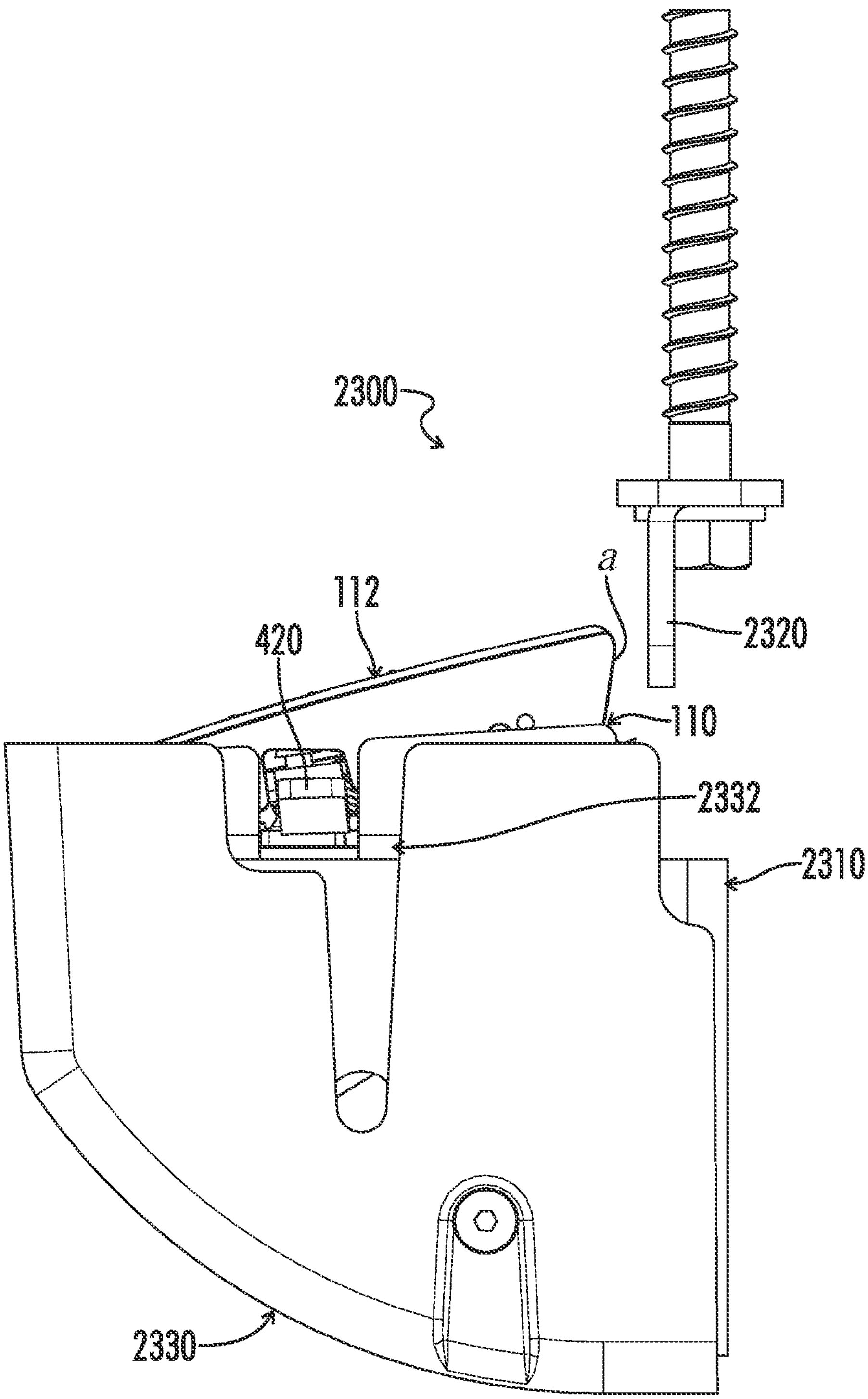
FIG. 27 illustrates a side elevation view of a locking apparatus according to an exemplary embodiment.
Figure 28:
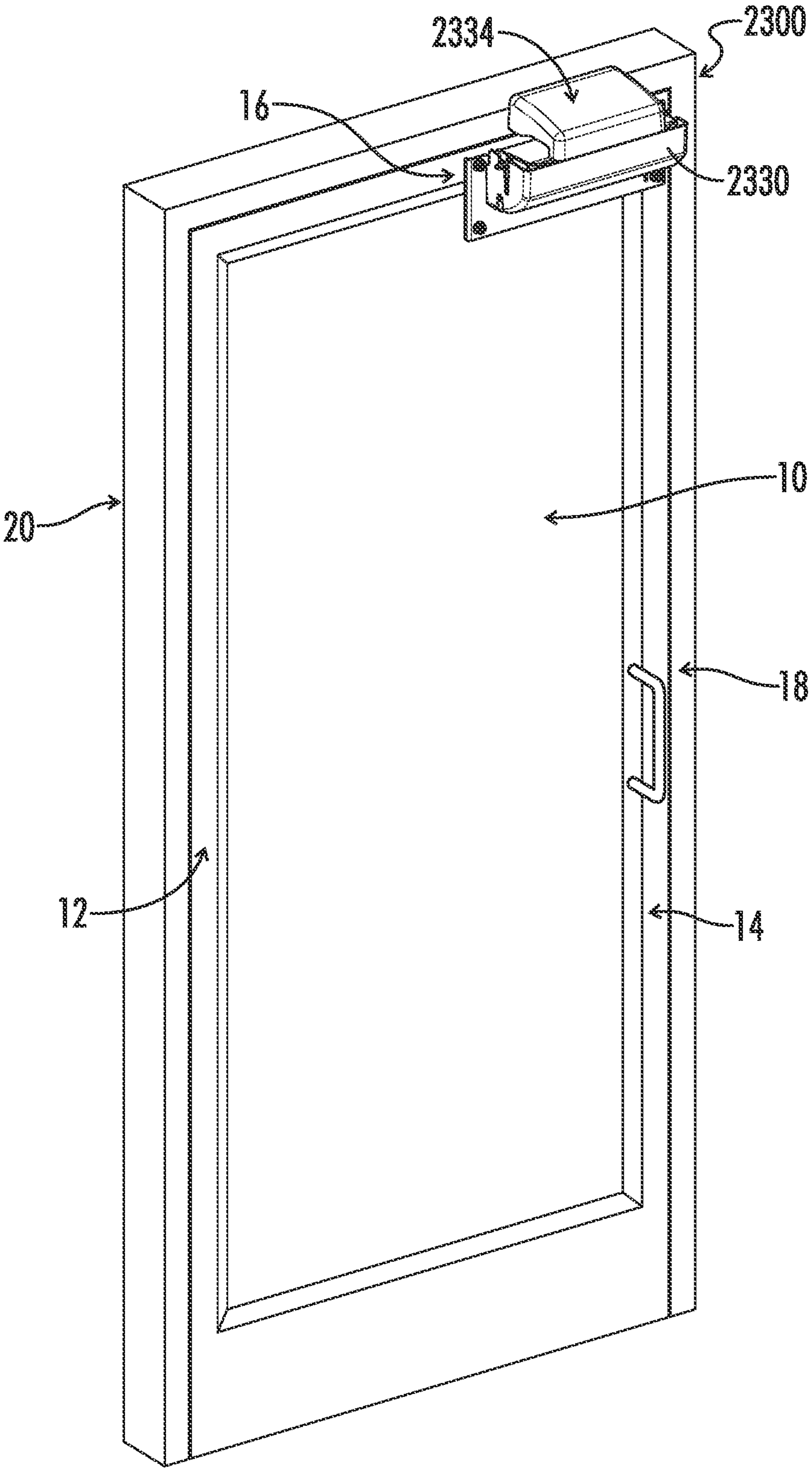
FIG. 28 illustrates a perspective view of a locking apparatus according to an exemplary embodiment mounted to an openable element.
Figure 29:
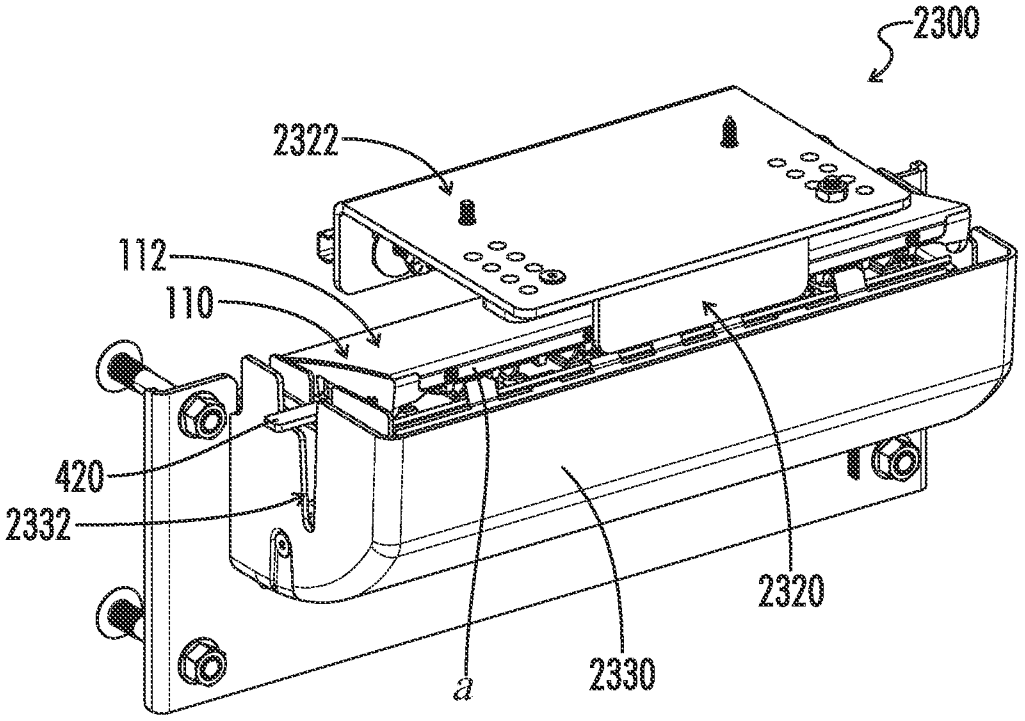
FIG. 29 illustrates a perspective view of a locking apparatus according to an exemplary embodiment.
Figure 30:
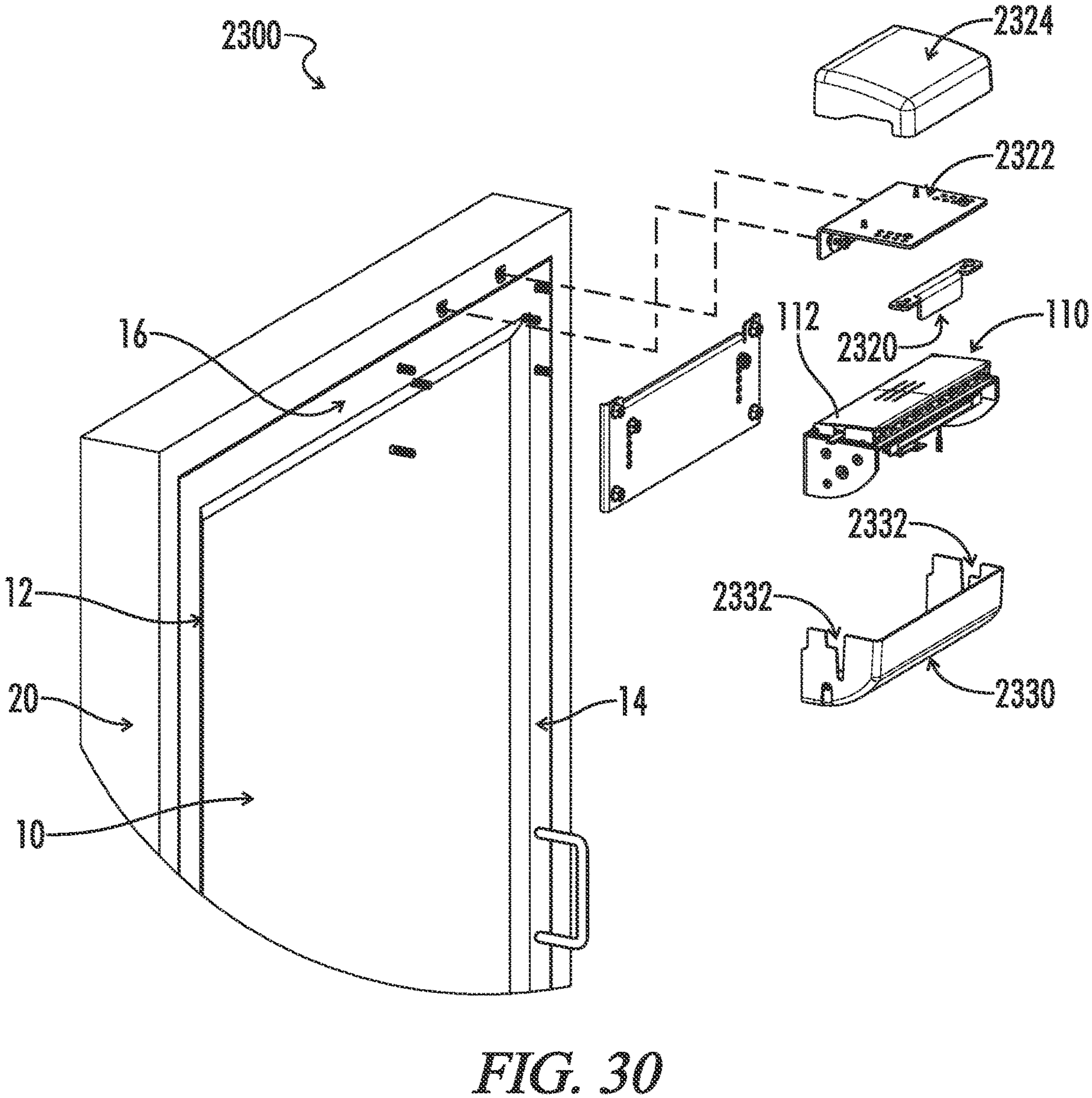
FIG. 30 illustrates an exploded perspective view of a locking apparatus according to an exemplary embodiment.
Figure 31:
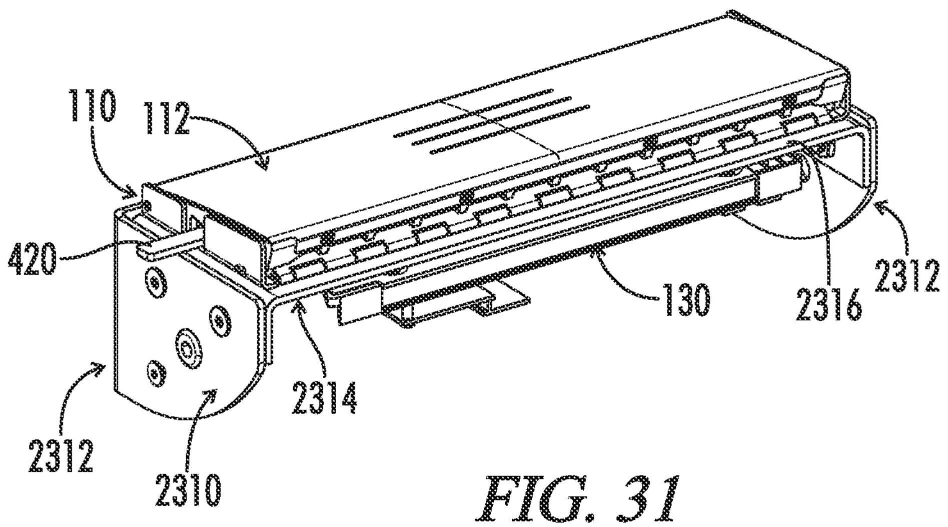
FIG. 31 illustrates an upper perspective view of a central member of a locking apparatus according to an exemplary embodiment.
Figure 32:
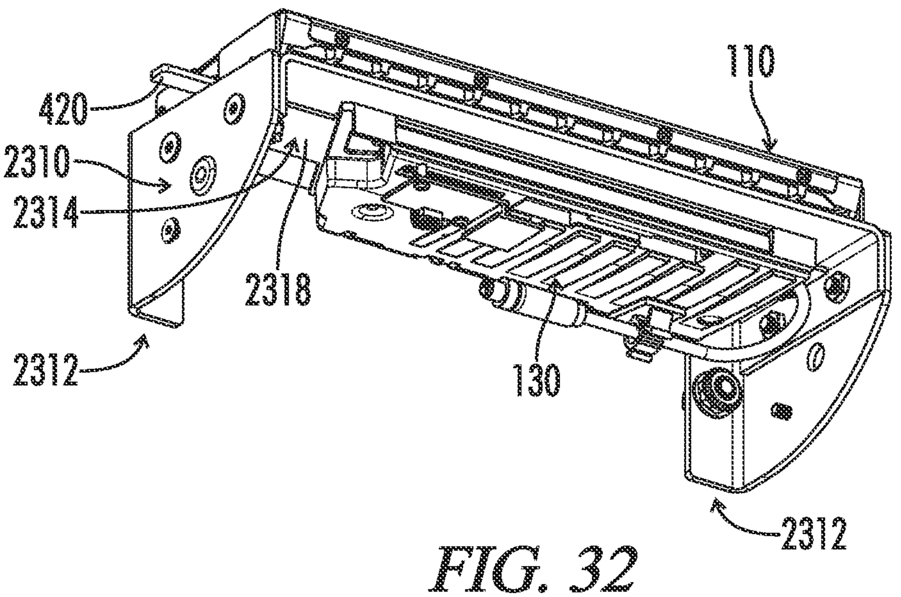
FIG. 32 illustrates a lower perspective view of a central member of a locking apparatus according to an exemplary embodiment.
Figure 33:
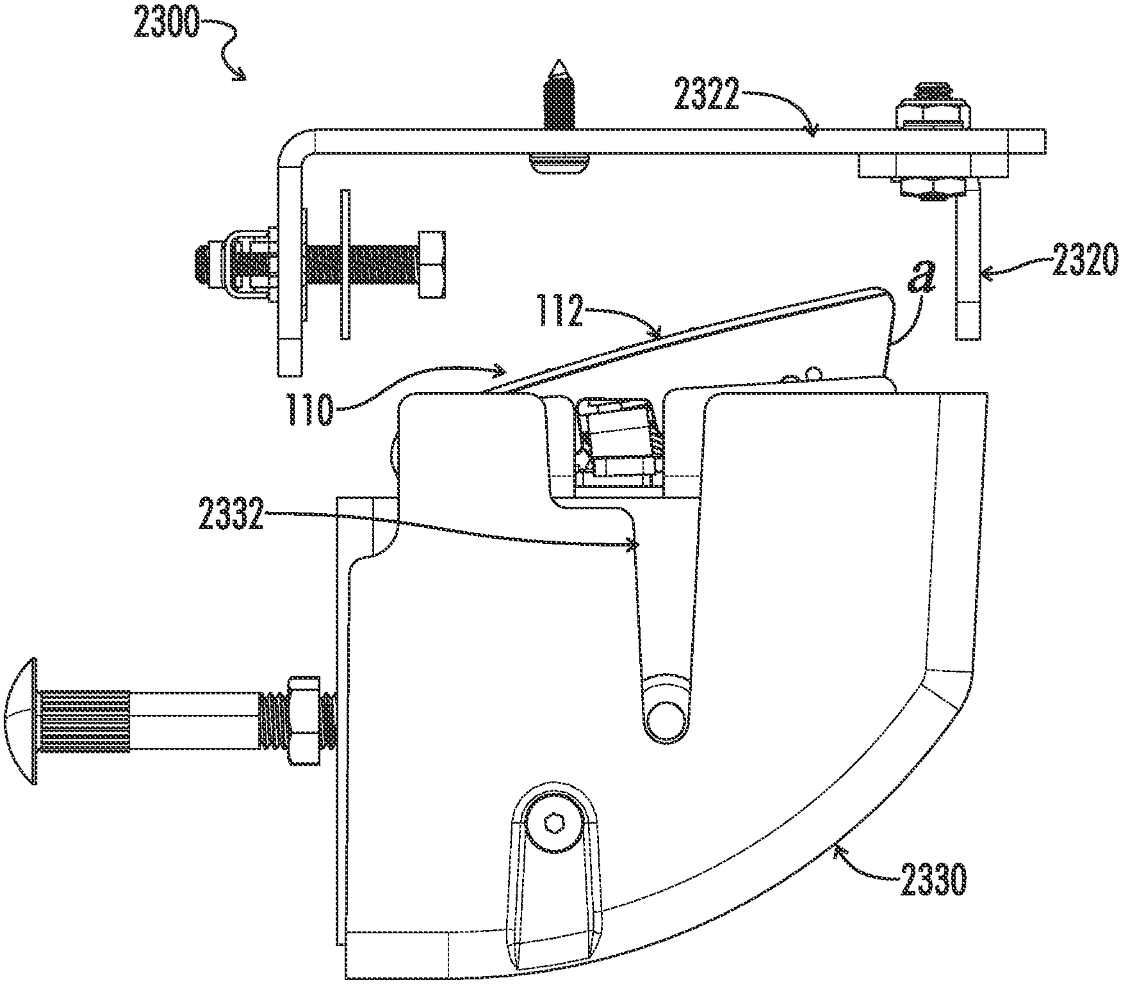
FIG. 33 illustrates a side elevation view of a locking apparatus according to an exemplary embodiment.

In optional embodiments, the openable element 10 may comprise a door which is either an outswing door (shown in FIGS. 22 and 24) or an inswing door (shown in FIGS. 28 and 30). In certain optional embodiments (e.g., outswing embodiments of the openable element 10), as illustrated in FIGS. 22 and 24, the contact surface a of the lifting member 112 may face the openable element 10. In accordance with this embodiment, the contact surface a may be described as facing a same direction as the mounting portion 2312 of the mounting bracket 2310. Further in accordance with this embodiment, the stop plate 2320 may be configured to be positioned between the openable element 10 and the contact surface a of the lifting member 112 when the openable element 10 is closed (e.g., fully nested within the frame 20) and when the lifting member 112 is raised.

In other optional embodiments (e.g., inswing embodiments of the openable element 10), as illustrated in FIGS. 28 and 30, the contact surface a of the lifting member 112 may face away from the openable element 10. In accordance with this embodiment, the contact surface a may be described as facing in an opposite direction as the mounting portion 2312 of the mounting bracket 2310, or positioned distal the mounting portion 2312. Further in accordance with this embodiment, the locking apparatus 2300 may further include a stop plate bracket 2322 configured to be coupled between the stop plate 2320 and the frame 20. The stop plate bracket 2322 may be configured to offset the stop plate 2320 from the frame 20 such that the stop plate 2320 is positioned adjacent to the contact surface a of the lifting member 112 when the openable element 10 is closed (e.g., fully nested within the frame 20) and when the lifting member 112 is raised. Accordingly, the stop plate bracket 2322 may enable the lifting member 112 of the central member 110 to be positioned between the openable element 10 and the stop plate 2320. As illustrated in FIGS. 28 and 30, the locking apparatus 2300 may further include a stop plate cover 2324 configured to cover the stop plate bracket 2322, for example, an upper portion of the stop plate bracket 2322.

Referring back to FIGS. 15 and 18, the adjustment member 1515, also referred to herein as a strap, may include a first strap end, a second strap end, and a strap midsection defined between the first and second strap ends. As illustrated in FIG. 18, the first and second strap ends may be coupled to the lifting member 112 (or 1812), for example, proximate to opposite ends of the lifting member. The strap midsection may be at least partially coupled bottom portion 1501, also referred to herein as the body. More particularly, the strap midsection may be repeatedly coupled between the bottom portion 1501 and the lifting member 112, via, for example, apertures defined in each, respectively. The adjustment member 1515 may be maintained in tension when the lifting member 112 is raised. The adjustment member 1515 may be configured to transfer energy from the openable element 10 between the bottom portion 1501 and the lifting member 112 and into the stop plate 2320 upon contact between the lifting member 112 and stop plate 2320 when the lifting member 112 is raised, due to, for example, a person forcibly attempting to open the openable element 10.

Figure 23:
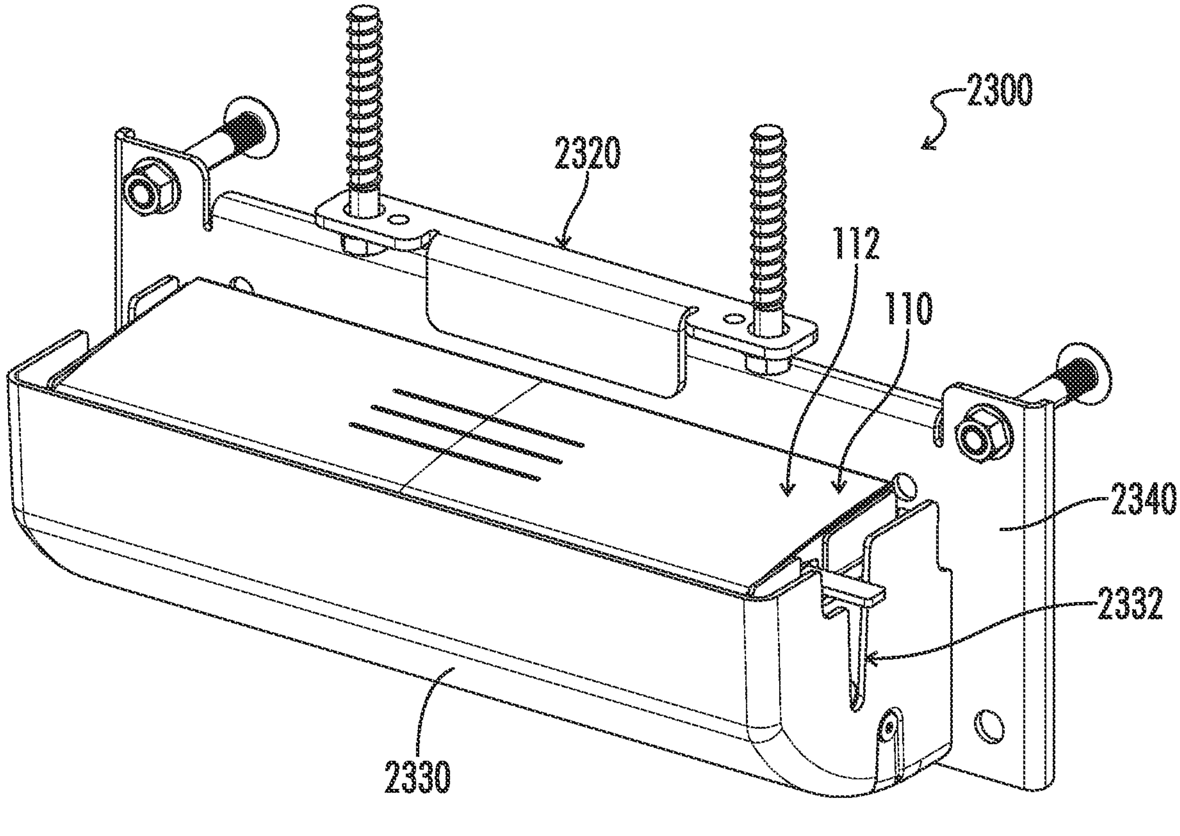
FIG. 23 illustrates a perspective view of a locking apparatus according to an exemplary embodiment.

As illustrated in FIGS. 22-24, the locking apparatus 2300 may further include a mounting bracket adapter plate 2340. The mounting bracket adapter plate 2340 may be configured to be coupled between the mounting bracket 2310 and the openable element 10. The mounting bracket adapter plate 2340 may be particularly useful for openable elements having a narrow rim surrounding a glass or other material center portion. The mounting bracket adapter plate 2340 allows the mounting bracket 2310 to be mounted to the openable element 10 regardless of the material of the center portion of the openable element 10.

The locking apparatus 2300 may further include the manual release 420 as discussed above. The manual release 420 may also be referred to herein as a manual operation mechanism or manual switch. The manual release 420 may be configured to permit manual operation by changing an operating state of the locking apparatus 100 when an input is received (e.g., by raising or lowering the lifting member 112 based upon actuation of the manual release 420). The manual release 420 may be accessible through the housing 2330. The housing 2330 may include a manual switch opening 2332. The manual release 420 may extend through the manual switch opening 2332 such that the manual release 420 may be easily manipulated. The manual release 420 may be particularly important when power and/or remote communications to the locking apparatus 2300 are lost.

In certain optional embodiments, the control circuit 450 may be positioned within the power housing 130. In other optional embodiments, the control circuit 450 may be coupled to the mounting bracket 2310 separate from the power housing 130 or positioned within the central member 110. In accordance with this embodiment, the control circuit 450 may be configured to detect contract between the stop plate 2320 and the lifting member 112 associated with attempted opening of the openable element 10 (e.g., during attempted forced entry).

Figure 34:
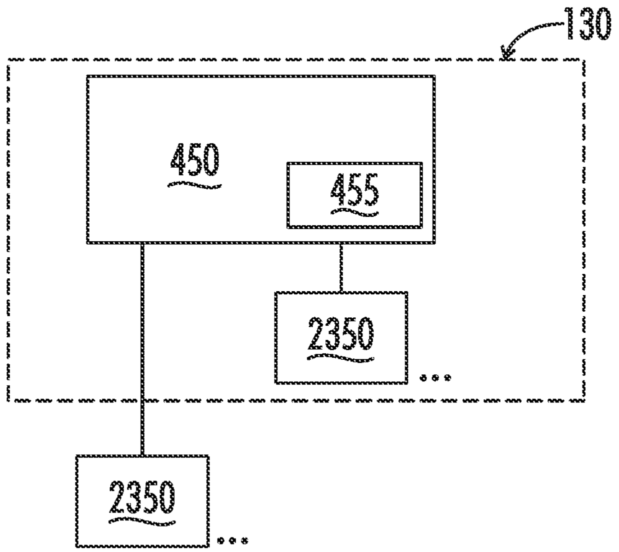
FIG. 34 illustrates a block diagram of the various electrical components of a locking apparatus according to an exemplary embodiment.

Referring to FIG. 34, a block diagram illustrating the various electrical elements of the locking apparatus 2300 is shown. The locking apparatus 2300 may further include one or more sensors 2350 communicatively linked to the control circuit 450. One of the one or more sensors 2350 may be defined by the contract terminal 1517 and the conductive contact surface 1710, as discussed above with regard to intrusion detection. Intrusions may alternatively be detected using a pressure or similar sensor coupled to one of the adjustment member 1515 or the contact surface a of the lifting member 112.

In certain optional embodiments, at least one of the one or more sensors 2350 may comprise an occupancy sensor. The control circuit 450 may be able to determine the presence of a person in the room. The control circuit 450 may further be able to determine and track the number of people in the room. This information may be useful by the control circuit 450 when determining whether to raise the lifting member 112 and lock the room in response to a hazardous situation outside of the room.

In certain optional embodiments, at least one of the one or more sensors 2350 may comprise smoke/fire/heat sensors, carbon monoxide/dioxide sensors, and/or other harmful chemical sensors. The control circuit 450 may utilize information from these types of sensors to generate audio communications and present said communications using speakers of the locking apparatus 2300 and/or automatically unlock the lifting apparatus 2300 (e.g., lower the lifting member 112).

In certain optional embodiments, at least one of the one or more sensors 2350 may comprise a shooter detection sensor which may comprise one or more of a sound sensor, a light flash sensor, or the like. The control circuit 450 may utilize information from the shooter detection sensor to lock the locking apparatus 2300 (e.g., raise the lifting member 112). Upon determination of an active shooter, the control circuit 450 may communicate with all other communicatively linked locking apparatuses 2300 and trigger a locking function in order to simultaneously lock all rooms at a given location.

Figure 35:
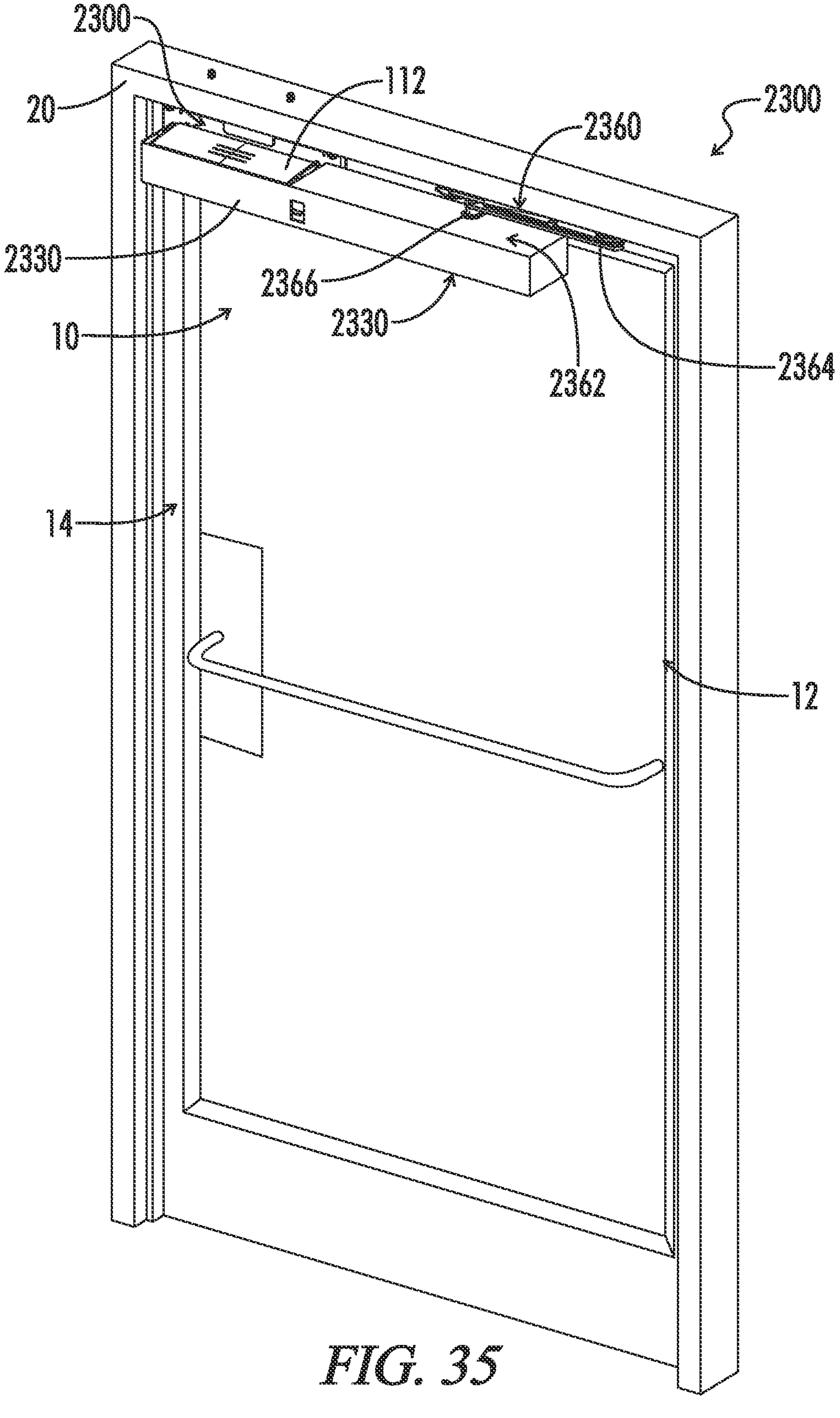
FIG. 35 illustrates a perspective view of a locking apparatus according to an exemplary embodiment mounted to an openable element and including a closer assembly.

Referring to FIG. 35, another embodiment of the locking apparatus 2300 is illustrated. In accordance with this embodiment, the locking apparatus 2300 may further include a closer assembly 2360 configured to bias the openable element 10 towards a closed position 18 (shown in FIGS. 22, 24, 28, and 30). The closer assembly 2360 may include closer mechanism 2362 and a closer arm 2364. The closer mechanism 2362 may be configured to be coupled to one of the openable element 10, the mounting bracket 2310, or the mounting bracket adapter plate 2340. The closer arm 2364 may be configured to be coupled between the closer mechanism 2362 and the frame 20. The closer mechanism 2362 may be configured to apply a tortional force to the closer arm 2364 for biasing the openable element 10 towards the closed position 18. The closer mechanism 2362 may be configured to be positioned within the housing 2330 of the locking apparatus 2300.

In certain optional embodiments, the locking apparatus 2300 may further include at least one small electromechanical generator 2366 (shown in FIG. 35). The at least one small electromechanical generator 2366 may also be referred to herein as at least one small hinge-mounted electromechanical generator 2366. As illustrated, the at least one small electromechanical generator 2366 is coupled between the closer mechanism 2362 and the closer arm 2364. In other optional embodiments, the at least one small electromechanical generator 2366 may alternatively, or additionally, be coupled between the various linkages of the closer arm 2364. The at least one small electromechanical generator 2366 may be configured to trickle charge the battery 134 (not shown) of the locking apparatus 2300 in order to prolong battery life and extend the time between plug-charging the battery 134. The at least one small electromechanical generator 2366 may enable the act of opening the openable element 10 to be employed as a means of generating electricity that can be captured by the battery 134 of the locking apparatus 2300.

A plurality of locking apparatuses 2300 may be deployed at a given location, such as, for example, a school or university to secure each of a plurality of rooms. Each of the plurality of locking apparatuses 2300 may communicate directly with one another and/or to a central management system using any known communications protocol, such that each of the plurality of locking apparatus may be controlled in unison, controlled in specified groups, or controlled individually. The locking apparatus 2300 may further include a camera, speakers, and/or a microphone for monitoring and communicating with occupants within the room in which the locking apparatus 2300 is deployed. The locking apparatus 2300 may further include emergency lights which may be used to inform an occupant of the room that an emergency situation is occurring.

Each locking apparatus 2300 may be controlled using a smartphone, a linked key fob, a linked egress button mounted near the frame, or manually using the manual release 420. The transceiver 455 of the locking apparatus 2300 may also be Z Wave Plus compatible. The locking apparatus 2300 may further be linked to a panic button positioned remotely from the locking apparatus 2300, whereupon activation of the panic button raises the lifting member 112. The locking apparatus 2300 may be deployed with various other accessories that enable or improve functionalities of the locking apparatus 2300 whether discussed above or not. For example, a locking apparatus 2300 internet hub may be used for cloud to cloud Bluetooth functionalities.

Implementations consistent with the present disclosure are capable of implementing both accelerometer-based and strap tension-based attack detection. Strap tension detection may be implemented, for example, by detecting a status of electrical contact between strap pins of the device and terminal contacts forming a contact electrical connection in the manner previously described. When a sufficient tension is created in the device strap, the electrical contact between at least one strap pin and terminal contact pair is broken and is capable of being detected via conductive lines connected to a control circuit. Accelerometer-based impact detection in the manner previously described may optionally be combined with the strap tension-based attack detection via the control circuit to differentiate between an impact and an attack (e.g., impact detected by an accelerometer in combination with an open circuit via the strap-tension based detection would result in the control circuit indicating an attack and optionally contacting one or more individuals or organizations regarding the detected attack).

The previous detailed description has been provided for the purposes of illustration and description. Thus, although there have been described particular embodiments of the present invention of a new and useful "Improved Locking Apparatus, Locking Member, and Method of Use," it is not intended that such references be construed as limitations upon the scope of this invention.

What is claimed is:

1. A locking apparatus for resisting movement of a door positioned within a frame, the locking apparatus comprising:
- a mounting bracket having a mounting portion and a support portion, the mounting portion configured to be coupled to the door;
- a central member configured to be coupled to the support portion of the mounting bracket, the central member comprising:
  - a body;
  - an actuator; and
  - a lifting member coupled to the body, wherein the lifting member is operable between a raised position corresponding to a locked state and a lowered position corresponding to an unlocked state, where the raised position has the proximal side of the lifting member elevated relative to the distal side of the lifting member, at least a portion of the lifting member being configured to be raised to the raised position or lowered to the lowered position relative to the body by the actuator, the lifting member comprising a contact surface configured to restrict movement of the door when the lifting member is raised;
- a stop plate configured to be coupled to the frame and aligned with the proximal side and the contact surface of the lifting member for restricting movement of the door when the lifting member is raised and is in the raised position;
- a housing configured to be coupled to the mounting bracket and at least partially surrounding the central member and the mounting bracket; and
- a control circuit configured to wirelessly receive a locking apparatus command and control operations of the locking apparatus.

2. The locking apparatus of claim 1, wherein: the mounting portion is oriented perpendicular to the support portion.

3. The locking apparatus of claim 1, wherein: the lifting member is mounted on the support portion of the mounting bracket with the contact surface of the lifting member facing the door.

4. The locking apparatus of claim 3, wherein: the stop plate is configured to be positioned between the door and the contact surface of the lifting member when the door is closed and when the lifting member is raised.

5. The locking apparatus of claim 1, wherein: the lifting member is mounted on the support portion of the mounting bracket with the contact surface of the lifting member facing away from the door.

6. The locking apparatus of claim 5, further comprising: a stop plate bracket configured to be coupled between the stop plate and the frame, the stop plate bracket configured to offset the stop plate from the frame such that the stop plate is positioned adjacent to the contact surface of the lifting member, distal the door, when the door is closed and when the lifting member is raised.

7. The locking apparatus of claim 1, further comprising: a mounting bracket adapter plate configured to be coupled between the mounting bracket and the door.

8. The locking apparatus of claim 1, further comprising: a manual operation mechanism configured to cause the lifting member to rise or fall based at least in part upon a user engagement of the manual operation mechanism.

9. The locking apparatus of claim 8, wherein: the housing includes a manual switch opening; and the manual operation mechanism extends through the manual switch opening of the housing.

10. The locking apparatus of claim 1, further comprising: a power housing connected to the central member comprising one or more of a power input and a battery to provide power to the central member.

11. The locking apparatus of claim 10, wherein: the central member is configured to be coupled to an upper surface of the support portion of the mounting bracket; and the power housing is configured to be coupled to a bottom surface of the support portion of the mounting bracket.

12. The locking apparatus of claim 10, wherein: the control circuit is positioned within the power housing, the control circuit including one or more sensors communicatively linked to the control circuit.

13. The locking apparatus of claim 12, wherein: the control circuit is configured to detect contact between the stop plate based upon movement of the door based on signals from at least one of the one or more sensors.

14. The locking apparatus of claim 12, wherein: the one or more sensors includes one or more of a fire detection sensor, a shooter detection sensor, an occupancy sensor, a chemical detection sensor, or a pressure sensor.

15. The locking apparatus of claim 1, further comprising: a closer assembly configured to bias the door towards a closed position, the closer assembly including a closer mechanism configured to be coupled to the door and a closer arm configured to be coupled between the closer mechanism and the frame, wherein the closer mechanism is configured to be positioned within the housing.

16. A door system comprising:
a door frame;
a door coupled to the door frame, wherein the door includes a hinged edge coupled to the frame and a free edge positioned opposite the hinged edge;
a locking apparatus for resisting movement of the door positioned within the door frame, the locking apparatus comprising:
a mounting bracket having a mounting portion and a support portion, the mounting portion coupled to the door;
a central member coupled to the support portion of the mounting bracket, the central member comprising:
a body;
an actuator; and
a lifting member coupled to the body, at least a portion of the lifting member being configured to be raised or lowered relative to the body by the actuator, the lifting member comprising a contact surface configured to restrict movement of the door when the lifting member is raised, wherein the lifting member is operable between a raised position corresponding to a locked state and a lowered position corresponding to an unlocked state, where the raised position has the proximal side of the lifting member elevated relative to the distal side of the lifting member;
a stop plate configured to be coupled to the frame and aligned with the proximal side of the lifting member for restricting movement of the door when the lifting member is raised; and
a housing configured to be coupled to the mounting bracket and at least partially surrounding the central member and the mounting bracket.

17. The door system of claim 16, wherein: the mounting bracket is configured to be coupled closer to the free edge than to the hinged edge.

18. The door system of claim 16, wherein: the door includes an upper edge portion; and the mounting bracket is configured to be coupled along the upper edge portion of the openable element.

19. The door system of claim 16, further comprising:
a control circuit configured to wirelessly receive a locking apparatus command from a user and control operations of the locking apparatus;
one or more sensors communicatively linked to the control circuit, wherein the one or more sensors includes one or more of a fire detection sensor, a shooter detection sensor, an occupancy sensor, a chemical detection sensor, or a pressure sensor; and
a power housing connected to the central member comprising one or more of a power input and a battery to provide power to the central member.

20. The locking apparatus of claim 16, wherein: the control circuit is configured to detect contact between the stop plate based upon movement of the door based on signals from at least one of the one or more sensors.

* * * * *